G. B. GROVER.
HEEL BUILDING MACHINE.
APPLICATION FILED SEPT. 4, 1915.

1,288,564.

Patented Dec. 24, 1918.
17 SHEETS—SHEET 1.

Inventor:
George B. Grover
by Wright Brown Quimby May
Attorneys

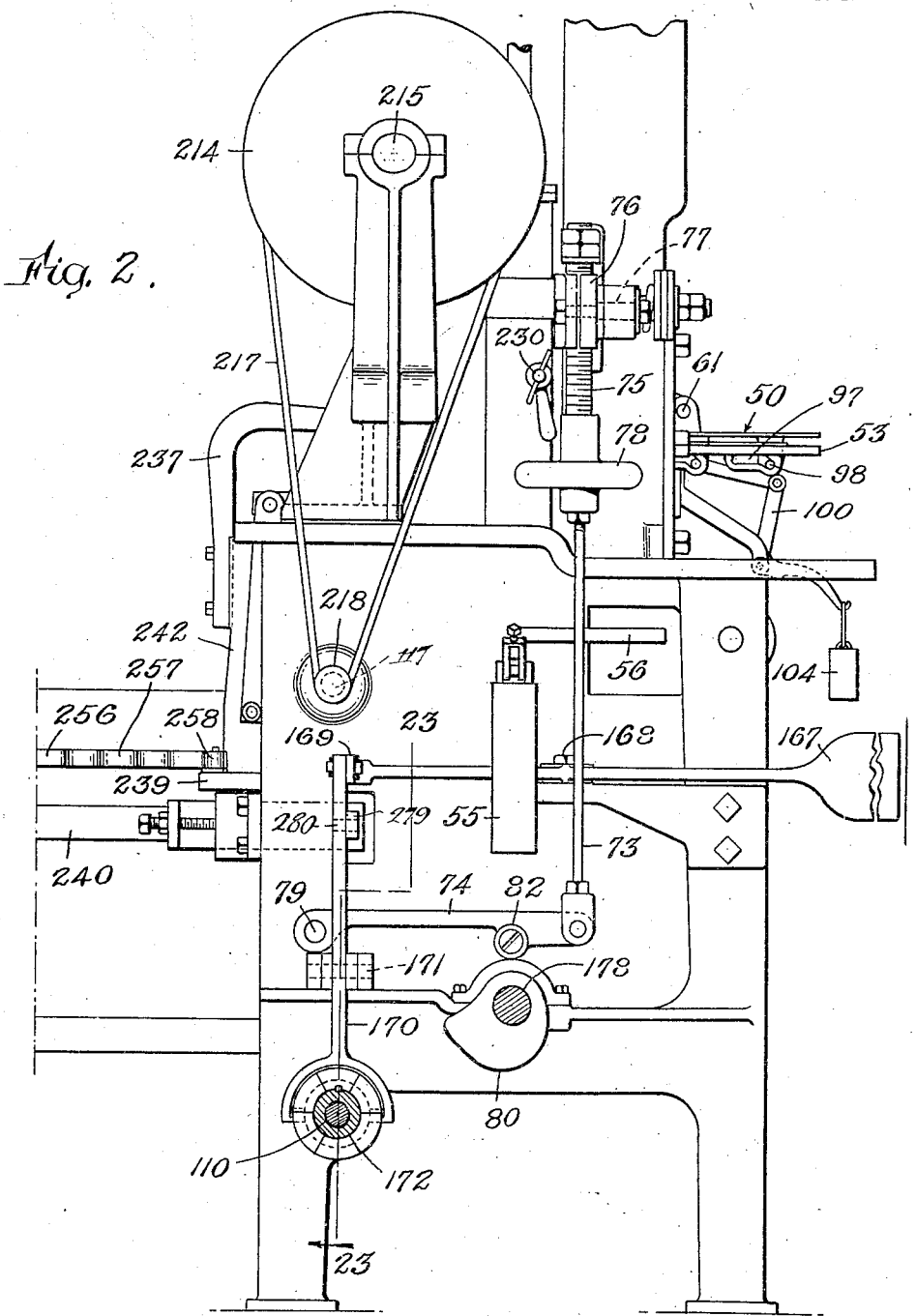

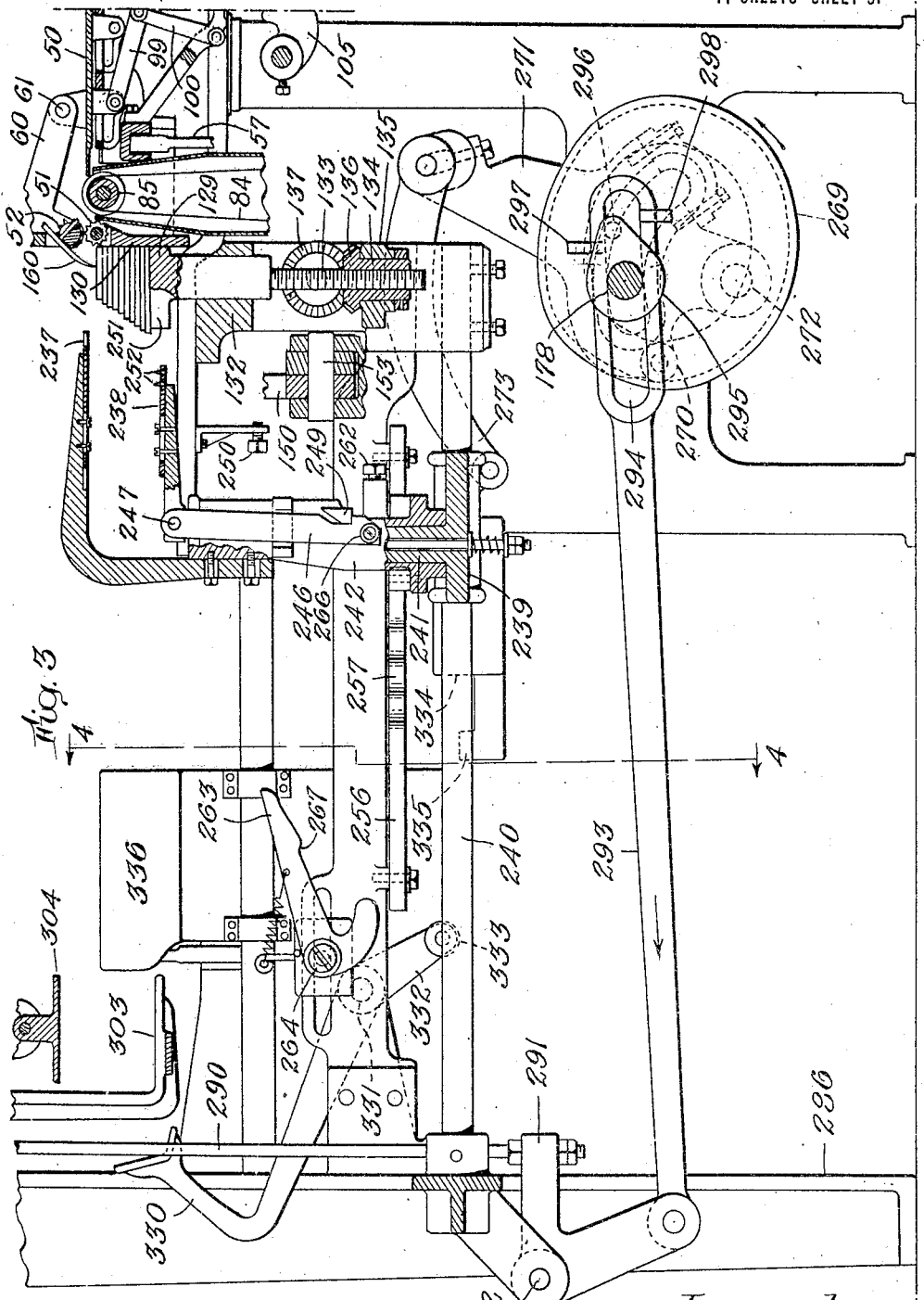

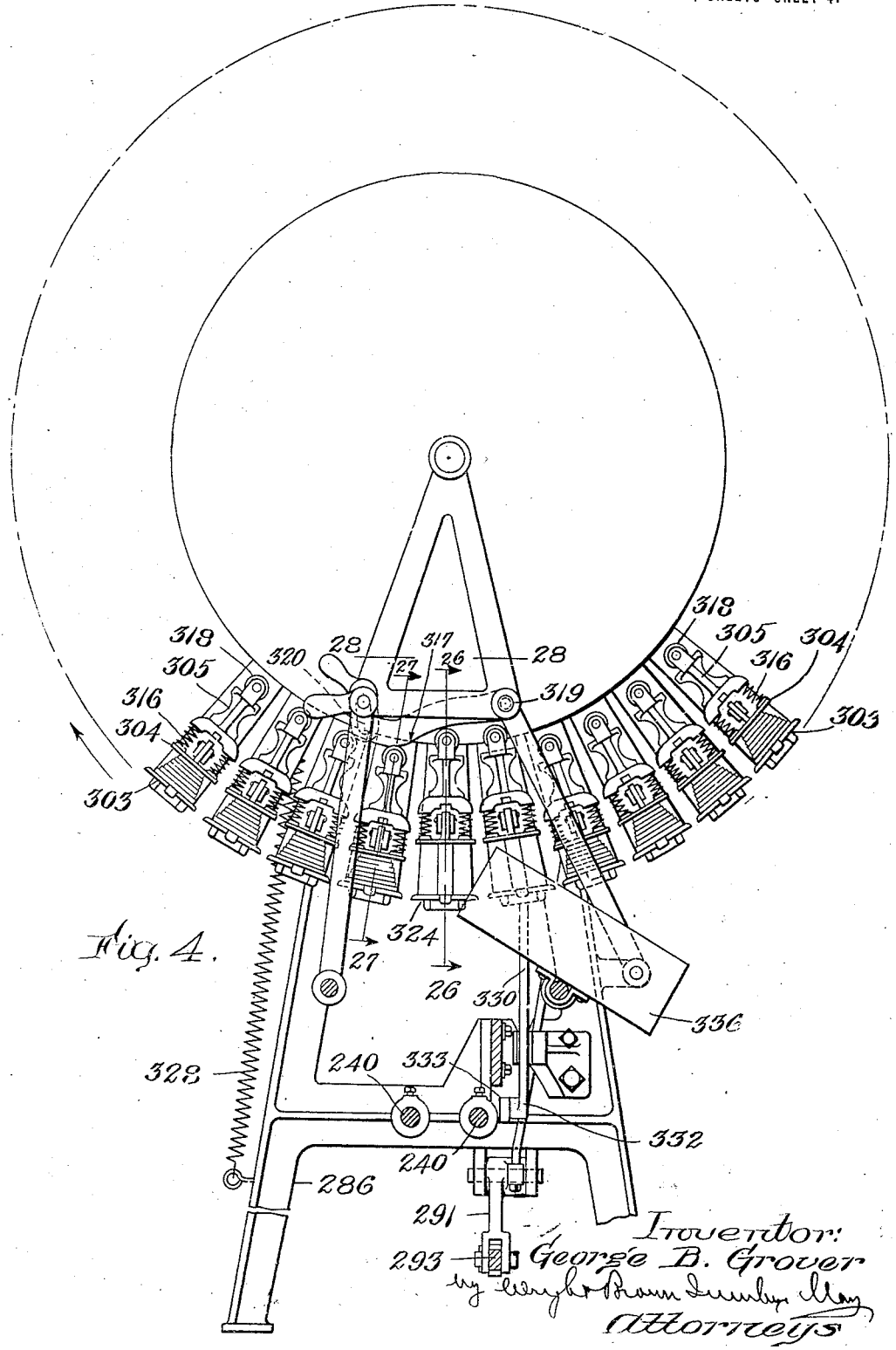

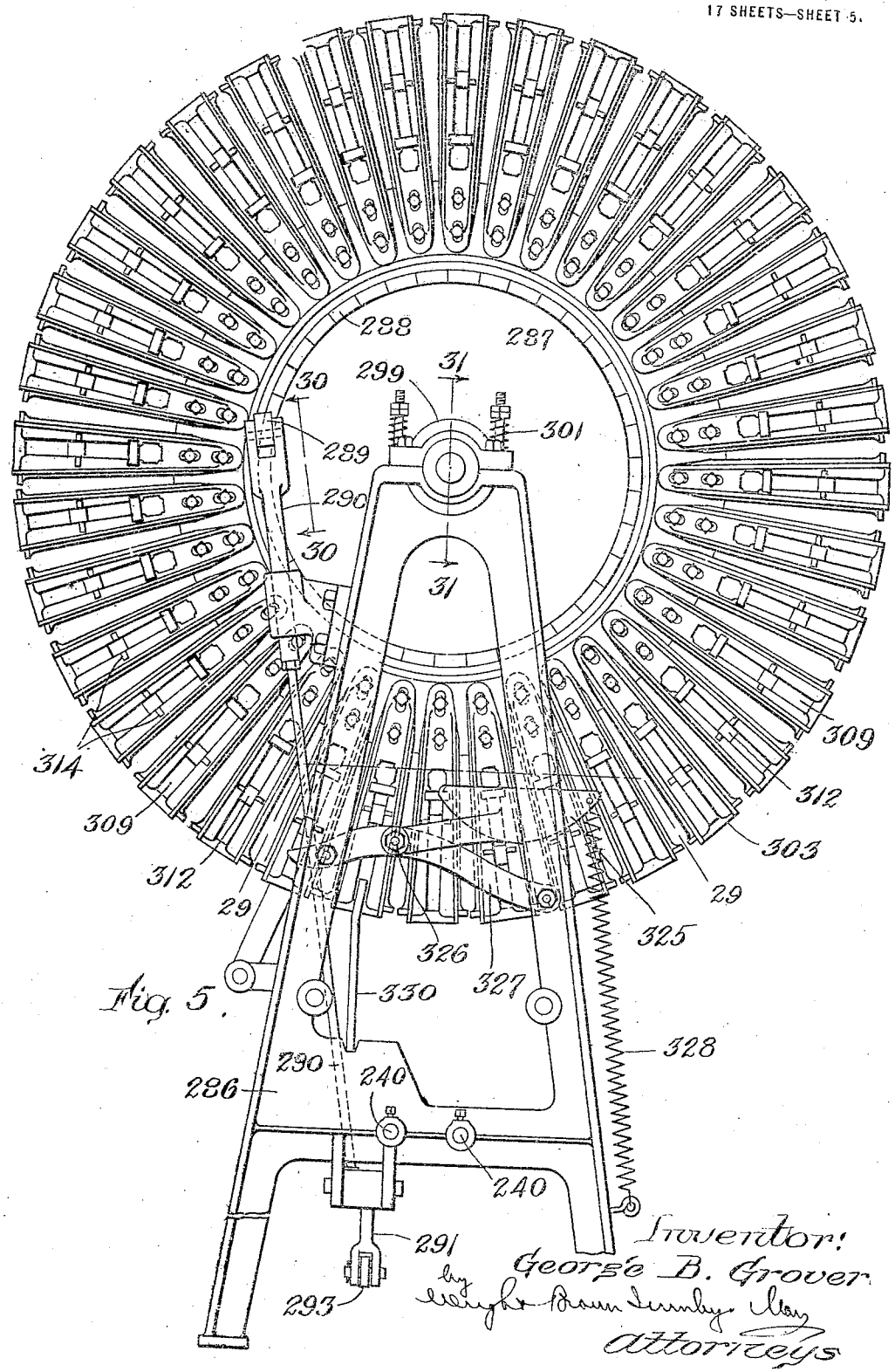

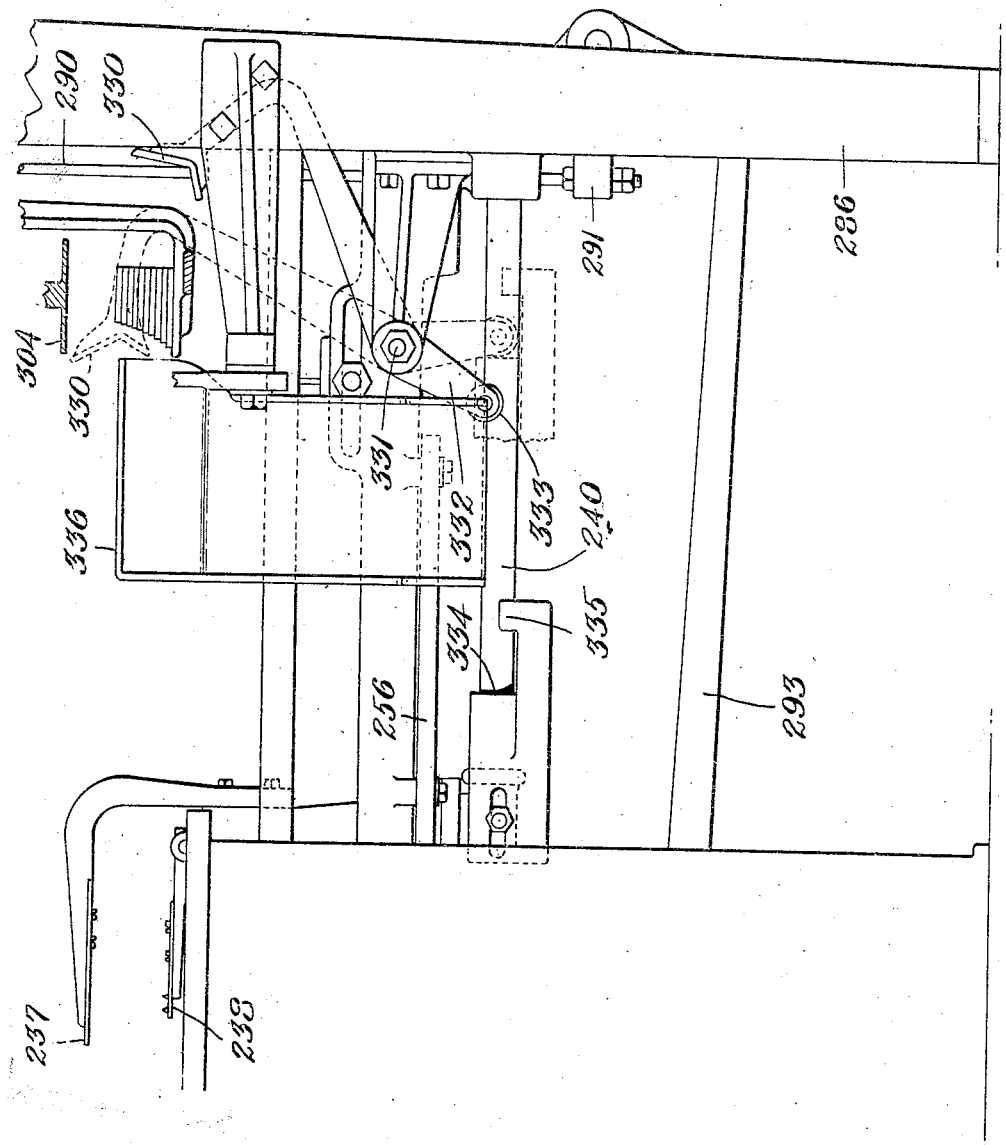

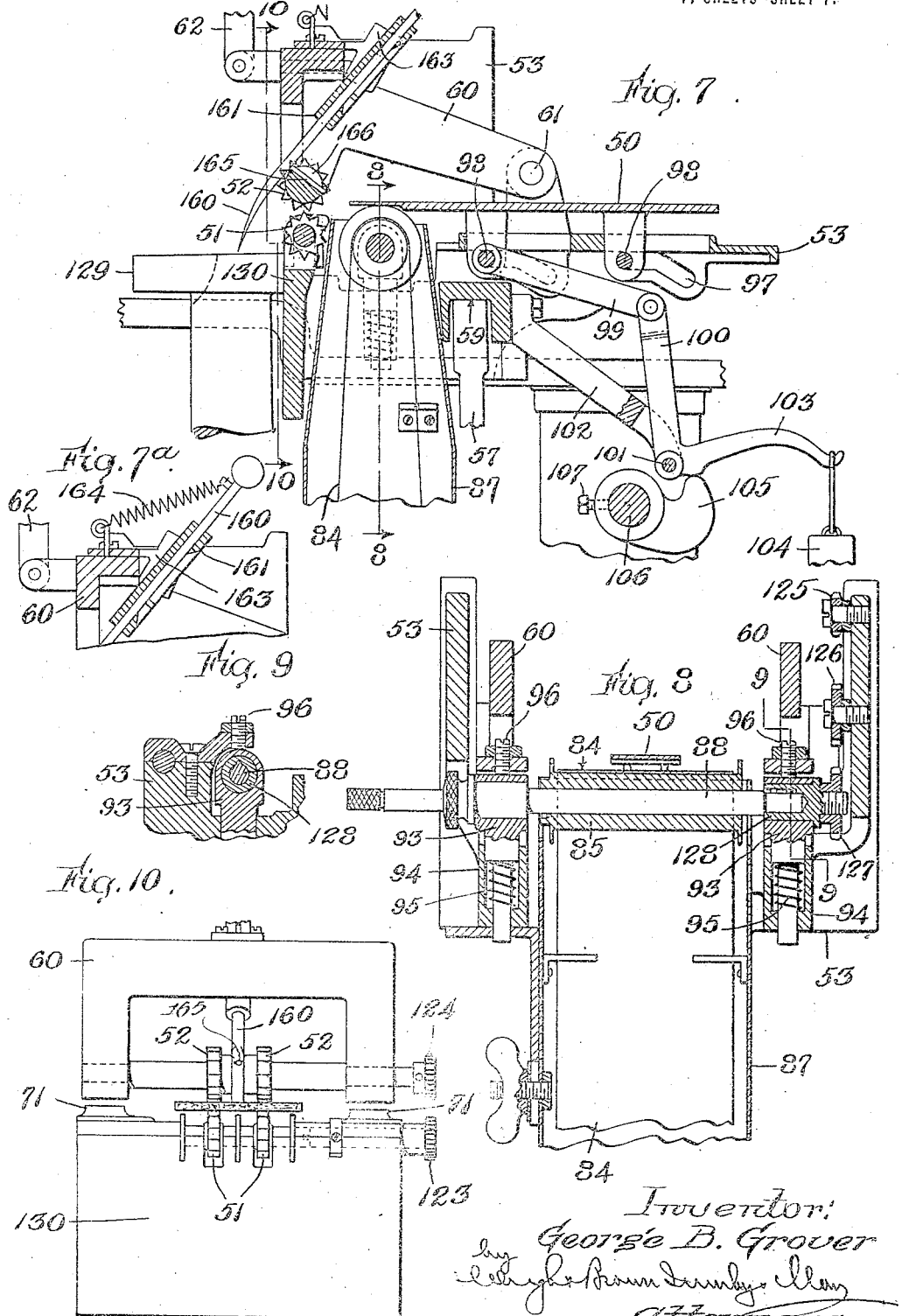

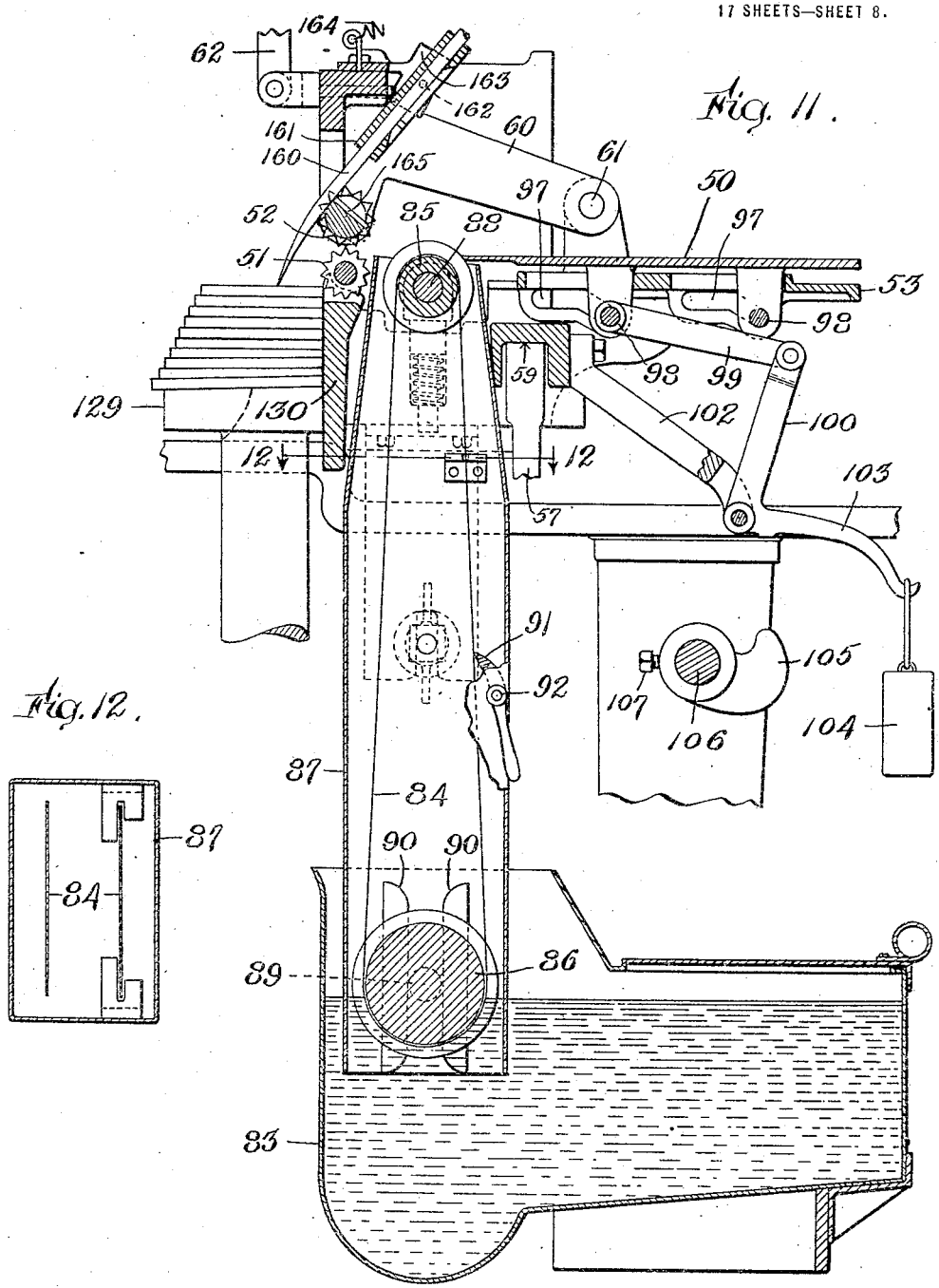

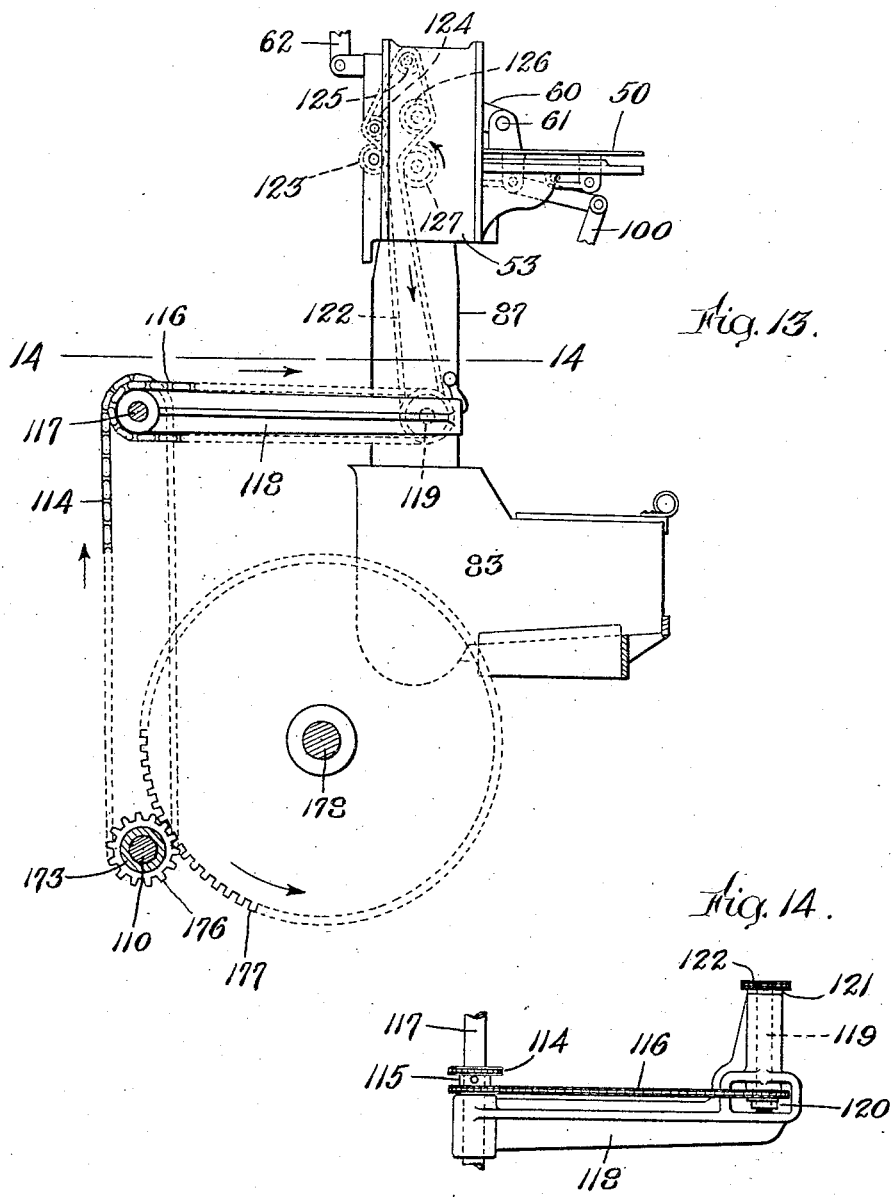

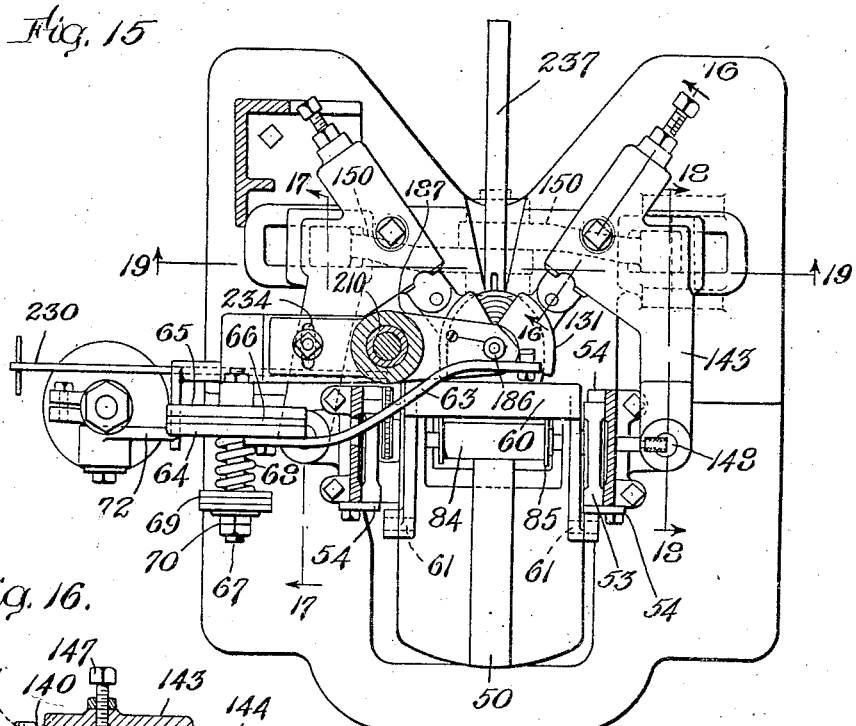
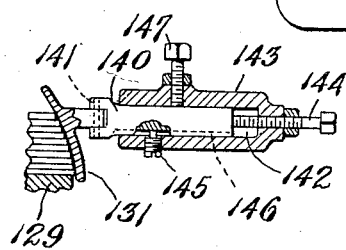
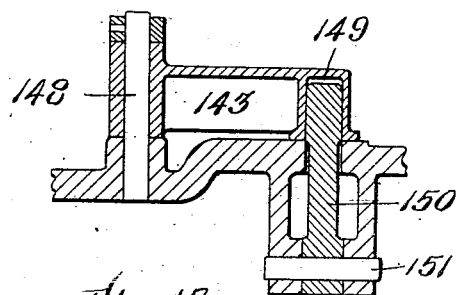
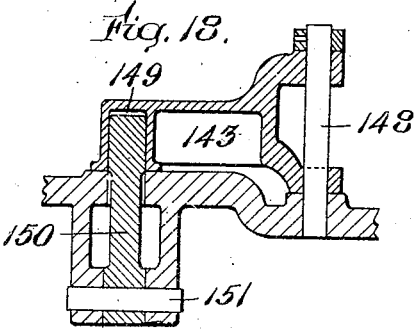

G. B. GROVER.
HEEL BUILDING MACHINE.
APPLICATION FILED SEPT. 4, 1915.
1,288,564.
Patented Dec. 24, 1918.
17 SHEETS—SHEET 11.
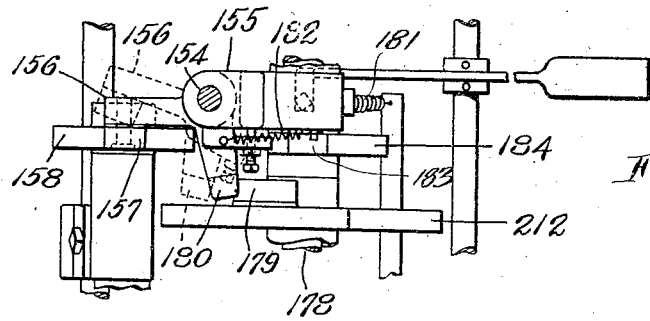
Fig. 21.
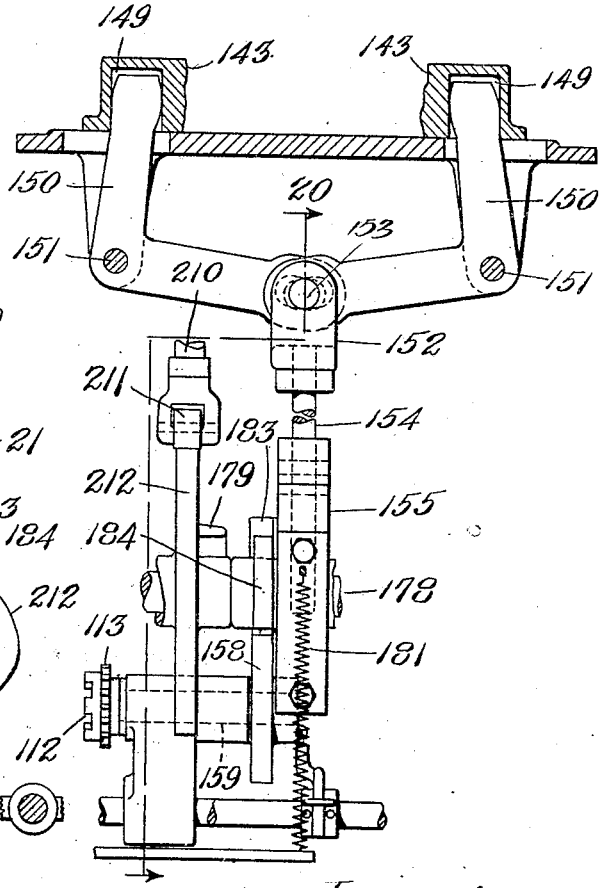
Inventor:
George B. Grover
Attorneys

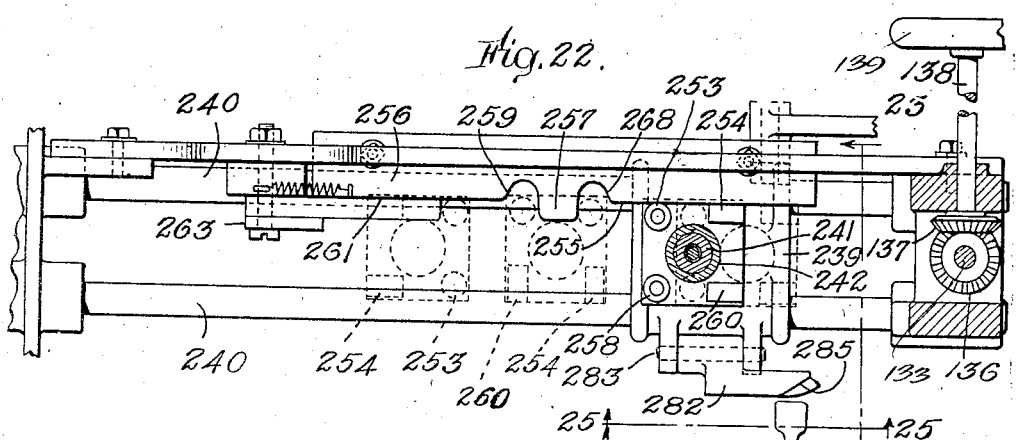
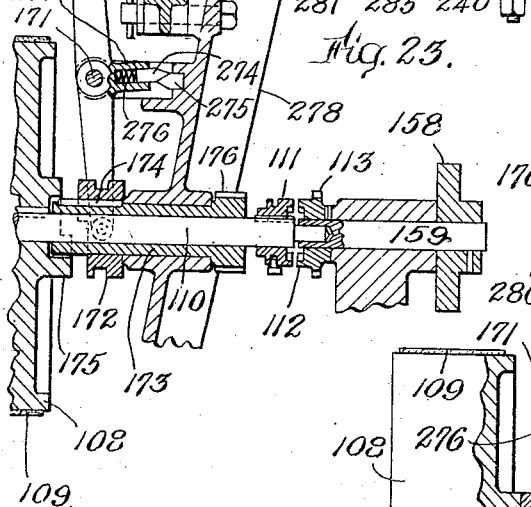
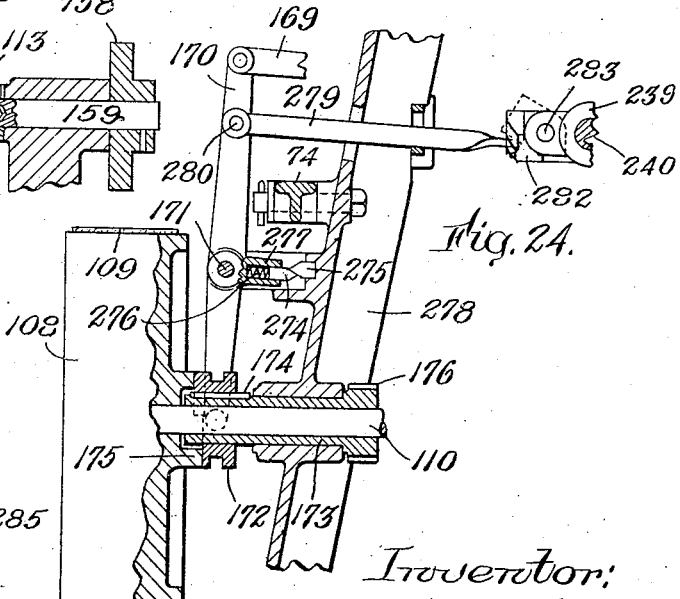
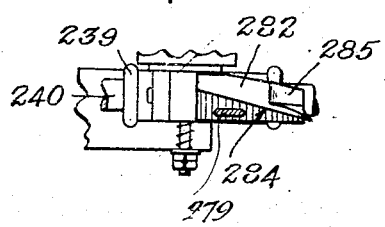

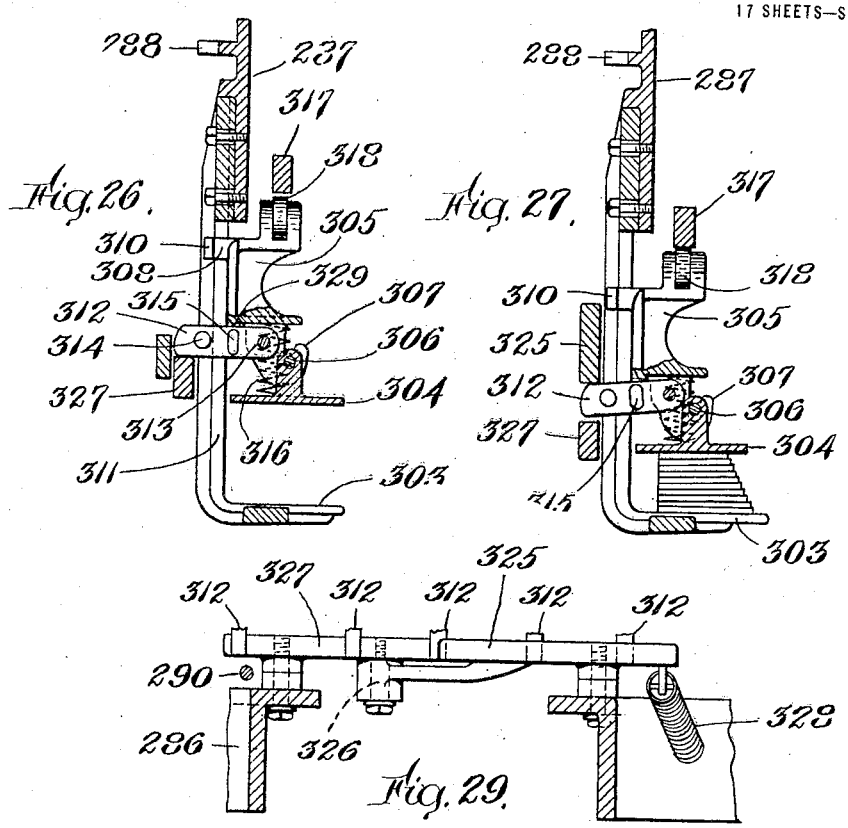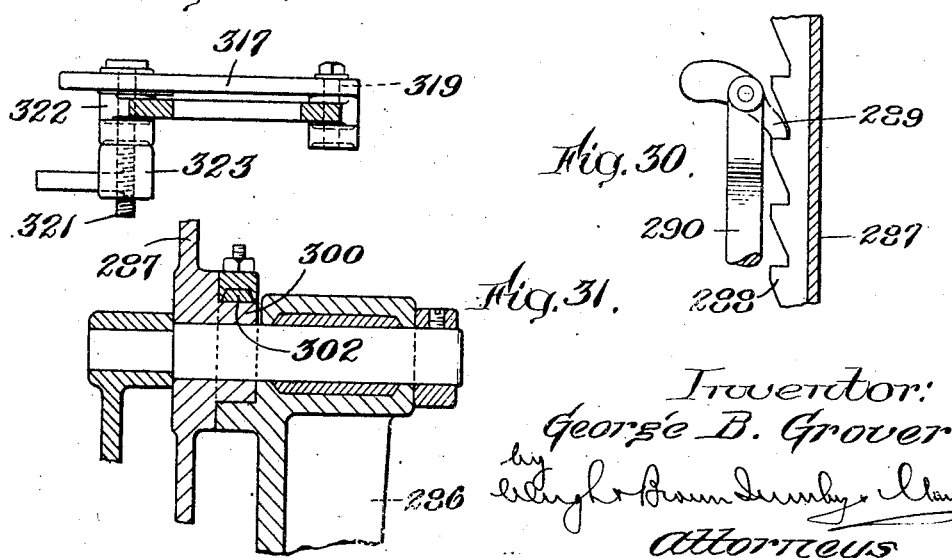

G. B. GROVER.
HEEL BUILDING MACHINE.
APPLICATION FILED SEPT. 4, 1915.

1,288,564.

Patented Dec. 24, 1918.
17 SHEETS—SHEET 14.

Inventor:
George B. Grover
by Elijah Brown Quimby May
Attorneys

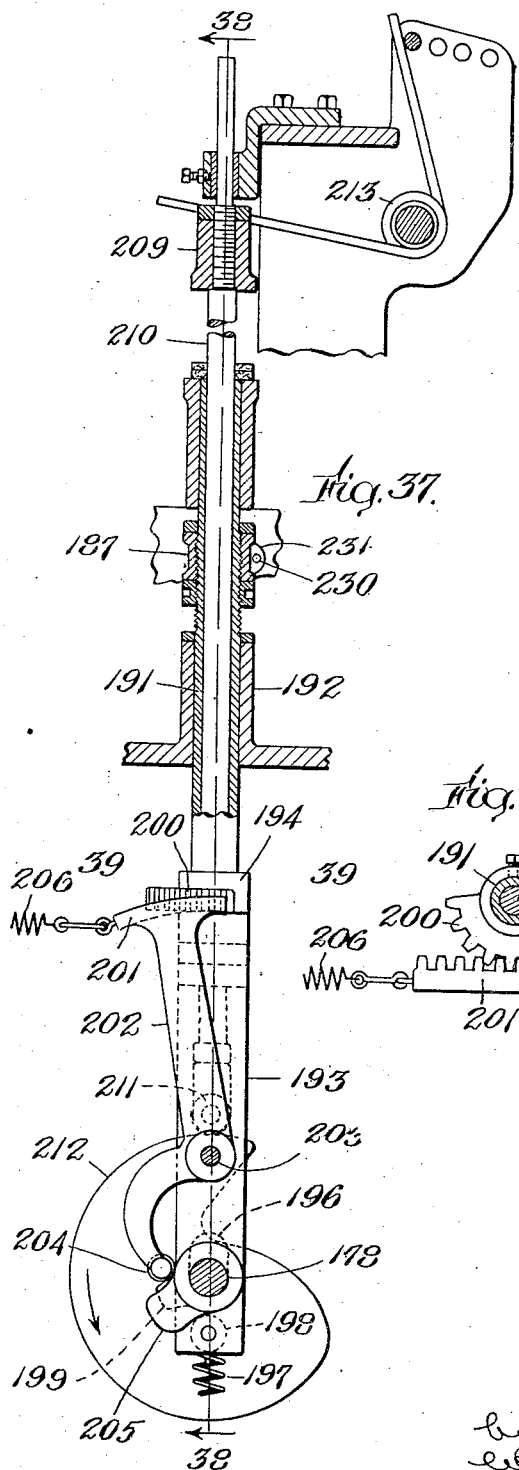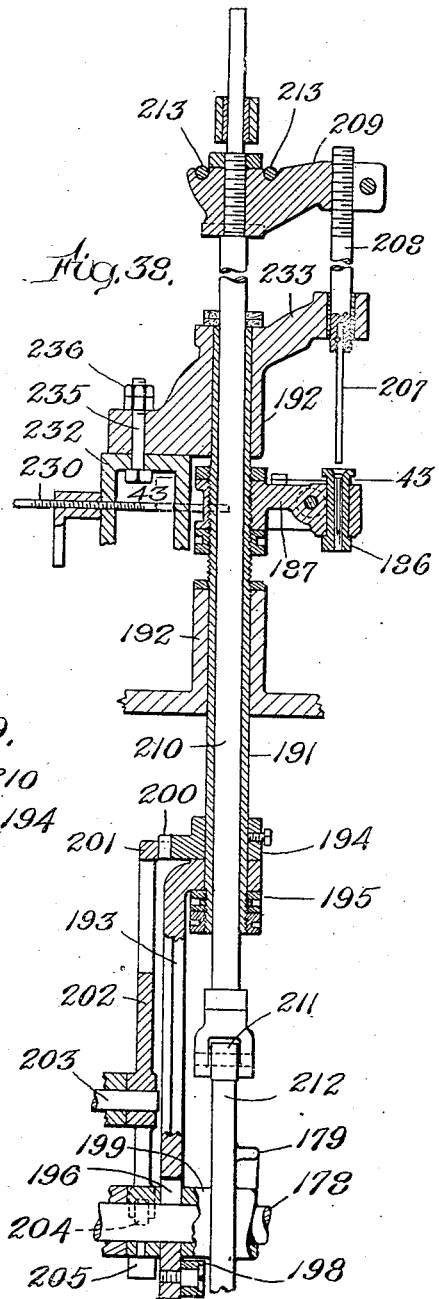

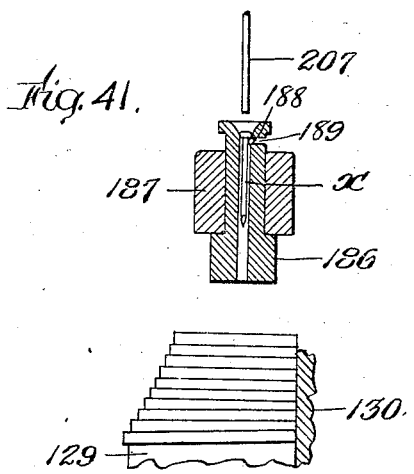
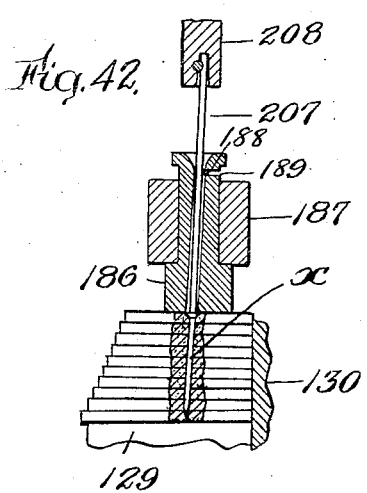
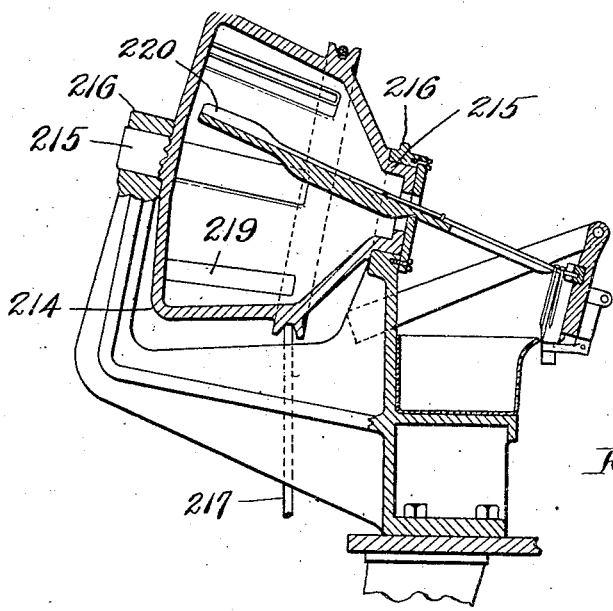
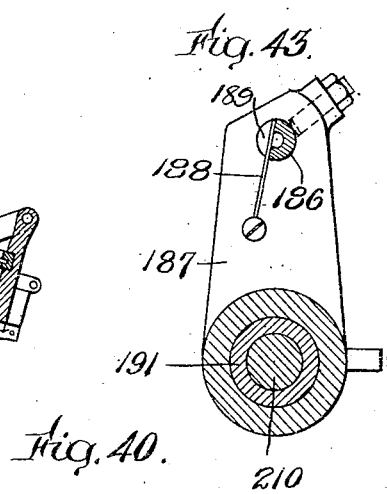

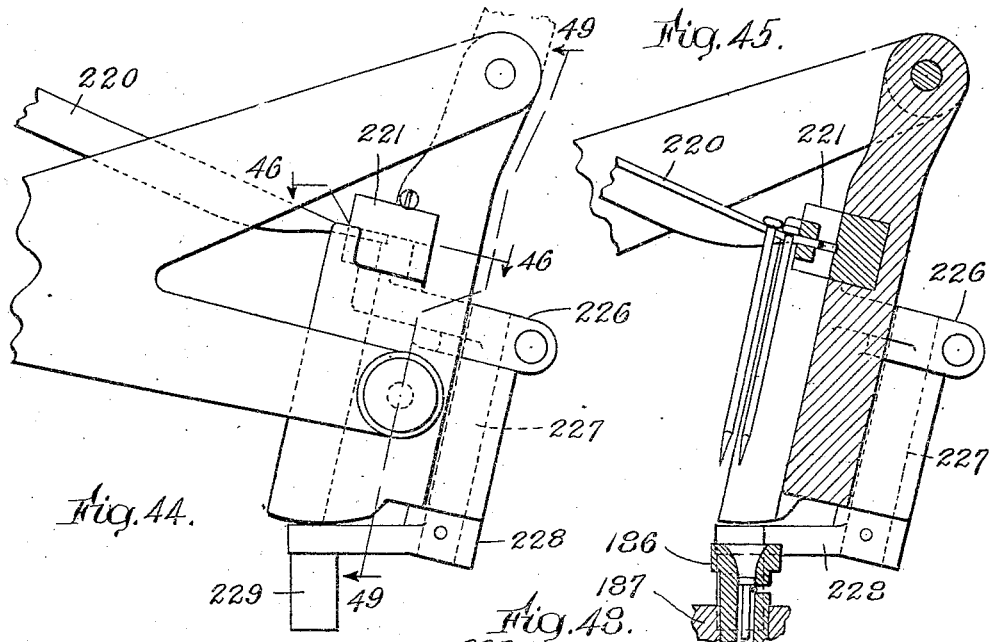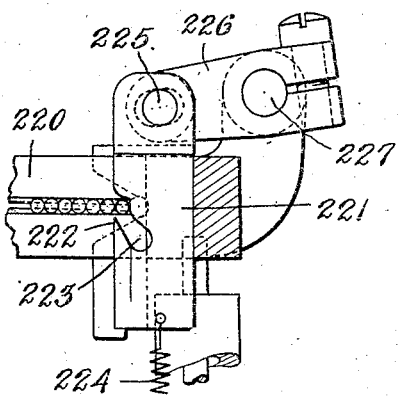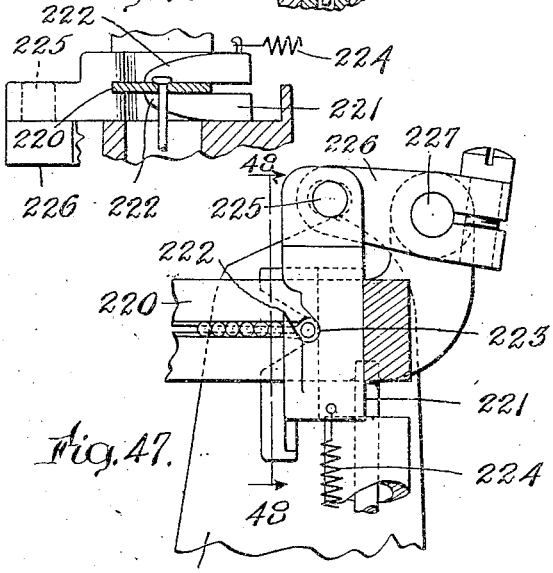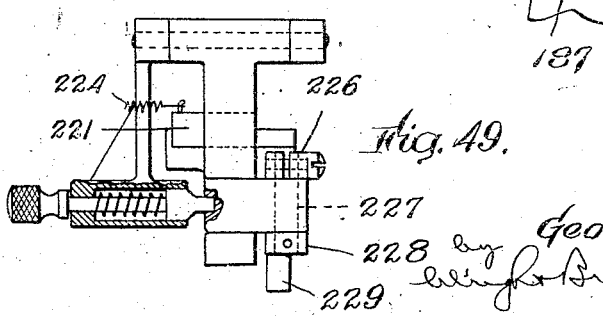

UNITED STATES PATENT OFFICE.

GEORGE B. GROVER, OF LYNN, MASSACHUSETTS, ASSIGNOR TO W. J. YOUNG MACHINERY COMPANY, OF LYNN, MASSACHUSETTS, A CORPORATION OF MASSACHUSETTS.

HEEL-BUILDING MACHINE.

1,288,564.

Specification of Letters Patent.

Patented Dec. 24, 1918.

Application filed September 4, 1915. Serial No. 49,075.

*To all whom it may concern:*

Be it known that I, GEORGE B. GROVER, a citizen of the United States, and resident of Lynn, in the county of Essex and State of Massachusetts, have invented certain new and useful Improvements in Heel-Building Machines, of which the following is a specification.

This invention relates to heel-building machines and has for its main object to provide an automatic machine by which lifts may be assembled to make a heel blank, coating such lifts with adhesive in the course of so assembling them; and further to provide as a combined part of such a machine in connection with means for so assembling lifts, a mechanism for receiving the heel blanks made by said means and retaining them under pressure while the adhesive dries or sets, transferring means for automatically carrying the blanks from the assembling means or mechanism to said heel retaining and pressing mechanism, and operating instrumentalities arranged and organized to effect conjoint action of said mechanisms and means in the proper order. The invention consists in the novel features of the organized machine for carrying out the above stated object described in the following specification, and in the principles underlying the same, having the characteristics as pointed out in the appended claims.

The heel-building mechanism comprises means for applying paste, under which term I include cement, glue, and any other adhesive suitable to the purpose to heel lifts, means for feeding the lifts into a heel-form, and nailing mechanism arranged to drive a nail through the lifts while the latter are in the form. The heel-pressing mechanism comprises a series of clamping units each of which is adapted to receive a heel-blank and to hold the blank under pressure until the paste or other adhesive with which the lifts have been coated has hardened. The heel-clamping units are moved so as to be brought successively into register with the transferring mechanism; and each unit, after receiving a heel-blank, is closed to put the heel under pressure. There may be any desired number of heel-clamping units, but I prefer to provide a relatively large number so that each heel-blank may remain under pressure for several minutes to enable the paste to set before the pressure is removed. The heels are allowed to remain in the clamping units as long as possible, and are ultimately ejected by suitable mechanism, so that each compressing unit may receive another heel-blank after having discharged the preceding heel-blank.

Of the accompanying drawings, which illustrate a machine comprising the combination of mechanisms hereinbefore mentioned:

Fig. 2 represents a left-side elevation of the heel-building mechanism.

Fig. 3 represents a vertical section in a plane from front to rear, showing portions of the heel-building mechanism, heel-retaining and pressing mechanism, and the transferring mechanism which transfers the heel-blanks from the building mechanism to the compressing mechanism.

Fig. 4 represents a vertical section, looking from front to rear, as indicated by line 4—4 of Fig. 3.

Fig. 5 represents a rear elevation of the heel-retaining and pressing mechanism.

Fig. 6 represents a side elevation including the mechanism which ejects the completed heels from the retaining mechanism. The direction of view is the opposite of Fig. 3.

Fig. 7 represents a vertical section in a plane from front to rear through the paste-applying mechanism and other elements of the heel-building mechanism, as viewed in the same direction as Fig. 3.

Fig. 7ª is a similar view of the upper portion of Fig. 7 to show parts omitted from the latter figure.

Fig. 8 represents a vertical section, as indicated by line 8—8 of Fig. 7.

Fig. 9 represents a vertical section, as indicated by line 9—9 of Fig. 8.

Fig. 10 represents a rear elevation of the lift-feeding mechanism as indicated by line 10—10 of Fig. 7.

Fig. 11 represents a vertical section in the same plane as that of Fig. 7, showing the feed table in another position and including the paste reservoir.

Fig. 12 represents a horizontal section through the paste applying mechanism, as indicated by line 12—12 of Fig. 11.

Fig. 13 represents a side elevation of the paste-applying mechanism and the driving mechanism therefor.

Fig. 14 represents a top plan view of a portion of the driving mechanism included within the range of line 14—14 of Fig. 13.

Figure 1:
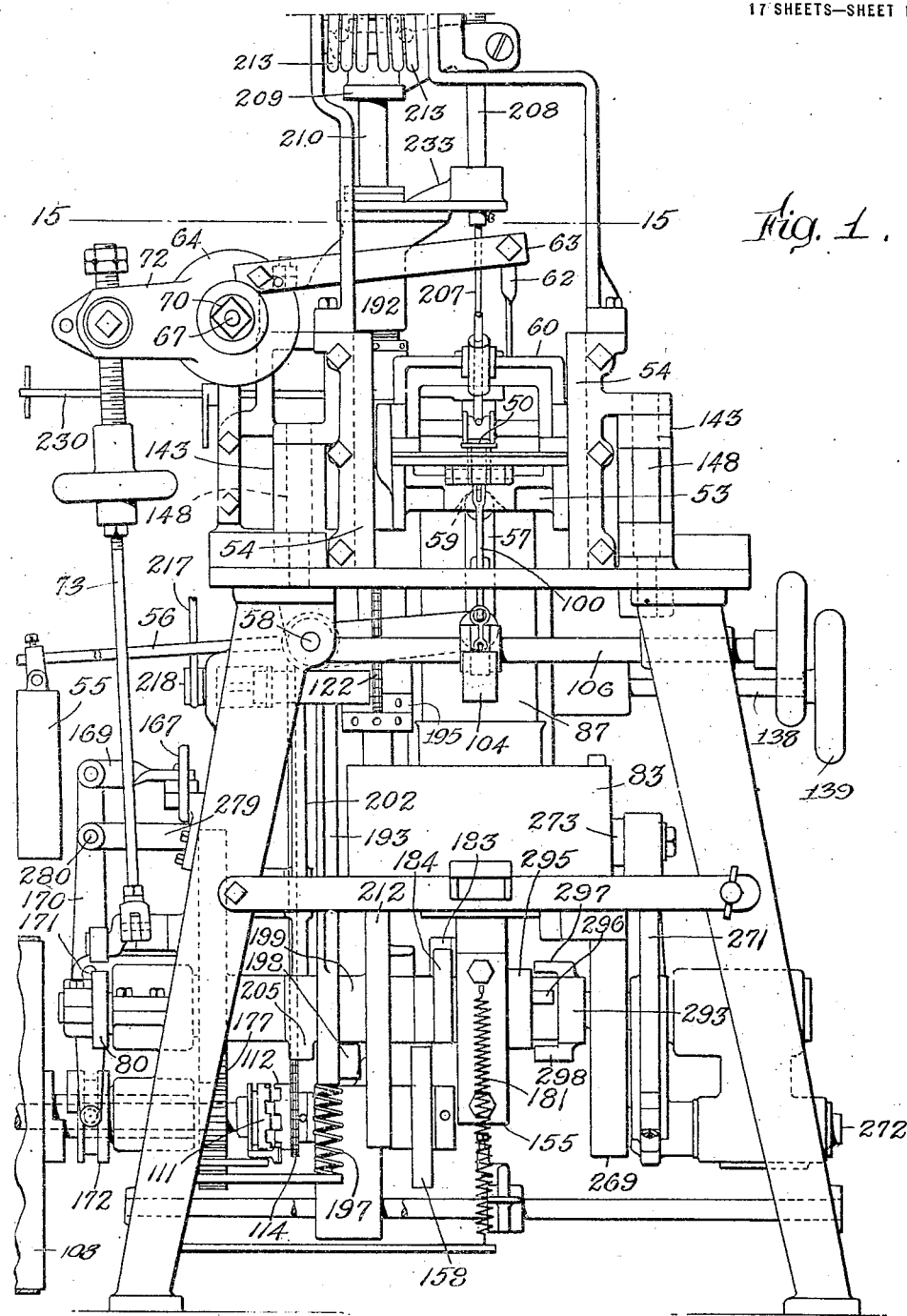
Figure 1 represents a front elevation of the heel-building mechanism.

Fig. 15 represents a horizontal section through the heel-building mechanism. See line 15—15 of Fig. 1.

Fig. 16 represents a sectional view through the structure intersected by line 16—16 of Fig. 15.

Fig. 17 represents a sectional view through the structure intersected by line 17—17 of Fig. 15.

Fig. 18 represents a sectional view through the structure intersected by line 18—18 of Fig. 15. Figs. 17 and 18 are companion views of the mechanism which actuates the movable elements of the heel-form.

Fig. 19 represents a front elevation, partly in section, of the mechanism which actuates the aforesaid movable elements of the heel-form. See line 19—19 of Fig. 15.

Fig. 20 represents an elevation, partly in section, of the mechanism included within the range of line 20—20 of Fig. 19.

Fig. 21 represents a top plan view of the mechanism below the line 21—21 of Fig. 20.

Fig. 22 represents a top plan view, partly in section, of the transferring mechanism which transfers the heel-blanks from the heel-building mechanism to the heel-retaining and pressing mechanism.

Fig. 23 represents a vertical section of clutch mechanism, as viewed from the plane indicated by line 23—23 of Fig. 22, and as indicated by line 23—23 of Fig. 2.

Fig. 24 represents a view of the said clutch mechanism in another position.

Fig. 25 represents a side elevation of a clutch-disconnecting device included in Fig. 22 within the range of line 25—25.

Fig. 26 represents a vertical section through one of the units of the heel retaining and pressing mechanism, and is indicated by line 26—26 on Fig. 4.

Fig. 27 represents a sectional view through the heel-clamping unit intersected by line 27—27 of Fig. 4, showing a heel-blank clamped thereon.

Fig. 28 represents a horizontal section through the structure intersected by line 28—28 of Fig. 4.

Fig. 29 represents a horizontal section through the heel-retaining mechanism as indicated by line 29—29 of Fig. 5.

Fig. 30 represents an elevation of the ratchet and pawl which are used to move the heel-clamping units successively into register with the heel-transferring mechanism. See line 30—30 of Fig. 5.

Fig. 31 represents a sectional view through the structure intersected by line 31—31 of Fig. 5.

Figure 32:
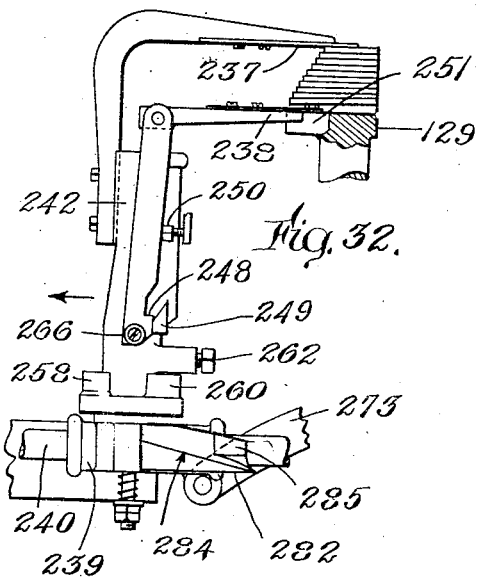

Fig. 32 represents a side elevation of the gripping jaws and adjacent elements of the heel-transferring mechanism, said jaws being shown in the act of removing a heel-blank from the heel-building mechanism.

Figure 33:
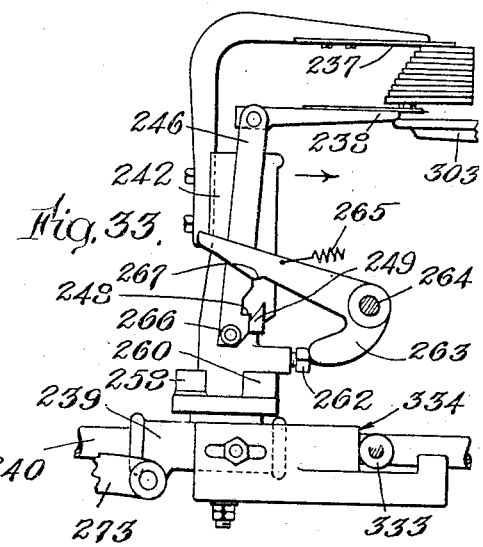

Fig. 33 represents an elevation of the transferring jaws as the latter are about to deposit the heel-blank in one of the heel-clamping units.

Figure 34:
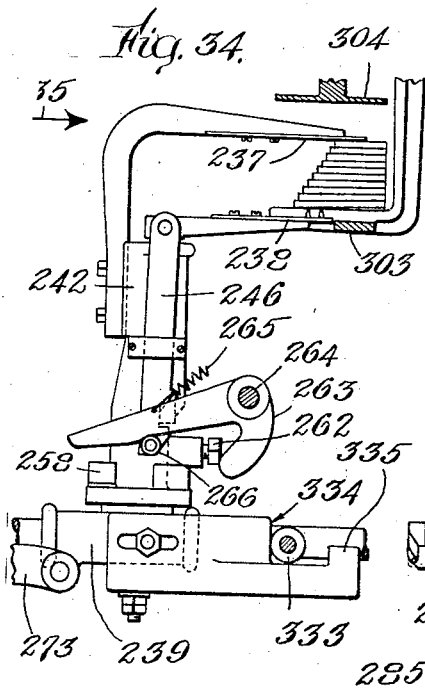

Fig. 34 represents a view similar to Fig. 33, showing the transferring jaws in open position, as having deposited the heel-blank in the heel-clamping unit.

Figure 35:
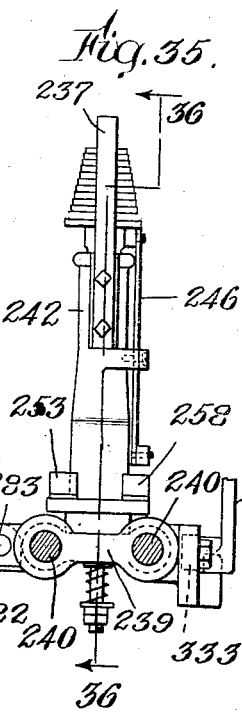

Fig. 35 represents an elevation of the heel-transferring mechanism included in Fig. 34, the direction of view being indicated by arrow 35.

Figure 36:
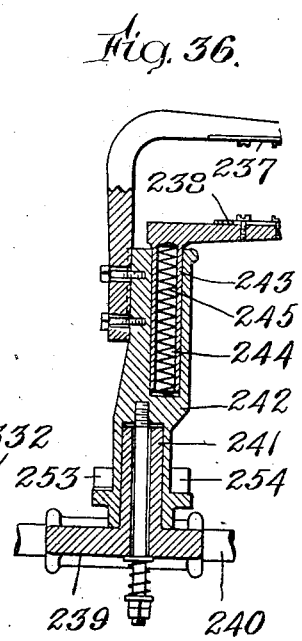

Fig. 36 represents a vertical section through the jaw-supporting structure, as indicated by line 36—36 of Fig. 35.

Fig. 37 represents a vertical section, partly in elevation, of the nail-driving mechanism.

Fig. 38 represents a vertical section through the structure intersected by line 38—38 of Fig. 37.

Fig. 39 represents a horizontal section through the structure on a line between the numerals 39—39 of Fig. 37.

Fig. 40 represents a vertical section through the nail reservoir, nail raceway, and nail-picking device.

Fig. 41 represents a view including a plurality of lifts stacked in the heel-form, and the nail holder and nail driver in their raised positions.

Fig. 42 is a view similar to Fig. 41, showing the nail holder bearing downwardly upon the lifts, and the nail driver as having driven a nail through the lifts.

Fig. 43 represents a horizontal section through the structure intersected by line 43—43 of Fig. 38.

Fig. 44 represents a front elevation of the nail-picking mechanism, and includes the lower portion of the nail raceway.

Fig. 45 represents a vertical section through the nail-picking mechanism, and includes a portion of the nail holder with a portion of a nail in the latter.

Fig. 46 represents a horizontal section through the structure intersected by line 46—46 of Fig. 44, showing the nail pick in its normal or initial position.

Fig. 47 is a view similar to Fig. 46, showing the nail pick as having discharged the foremost nail into the nail holder. The relation of elements in Fig. 47 is the same as in Fig. 45.

Fig. 48 represents a section through the structure intersected by line 48—48 of Fig. 47.

Fig. 49 represents a view, partly in elevation and partly in section, of the nail-feeding mechanism. See line 49—49 of Fig. 44.

The same reference characters indicate the same parts wherever they occur.

The heel-building mechanism includes a feed table, paste-applying means, lift-feeding mechanism, a heel-form in which the lifts are stacked, nailing mechanism by which a nail is driven through the lifts which are stacked in the form, and suitable operating mechanisms, all of which will be described in due course. Before describing the structural details, it may be stated that the heel-form includes movable members which are arranged to engage the edges of the lifts and which are reciprocated while the heel-building operation is in progress, to arrange the lifts in the desired relation for nailing. The operative feeds the lifts manually along the feed table to the feeding mechanism, and each lift, with the exception of the first lift of each heel, is moved into contact with the paste-applying mechanism before reaching the feeding mechanism. When the desired number of lifts have been deposited in the heel-form, the operative moves a lever which connects a clutch, and the several mechanisms which are driven while the said clutch is connected cause the operation of the nail-driving mechanism, the heel-transferring mechanism, the heel-compressing mechanism, the heel-ejecting mechanism, and the stop mechanism by which the said clutch is automatically disconnected when one cycle of the transferring operation has been completed.

*Lift-feeding mechanism.*

The feed table is indicated at 50 and is shown best by Figs. 7, 8 and 11. The direction of feed is from right to left with reference to Figs. 7 and 11. The lifts pass from the feed table to a pair of coöperative feed rolls 51 and 52 which, in the present instance, are provided with teeth or spurs. The feed rolls deposit the lifts in the heel-form, which is hereinafter described. The feed table and feed rolls are moved upward step by step in order to feed the successive lifts of one heel in successively higher planes as the heel increases in height, and then down to the starting point after completion of the heel. For this purpose the feed table and the roll 51 are mounted upon a vertically movable head 53, said head being arranged to move in guides 54. (See Figs. 1 and 15). The head is sustained by a counterweight 55 through suitable connections which include a lever 56 and a link 57. The fulcrum of the lever is indicated at 58 in Fig. 1. The connection between the link 57 and head 53 is in the form of a knuckle joint, the head being formed with a socket 59 in which the upper end of the link bears. This form of connection permits angular movement of the link as required by the angular movement of the lever 56, and the link is always held seated in the socket by the weight 55. The lifting power of the counterweight is greater than the load upon the link 57, and consequently the head 53 will always rise in response to the lifting stress of the counterweight whenever it is permitted to do so. The passage of the lifts between the feed rolls 51 and 52 forces the upper feed roll upwardly, and this displacement of said upper roll permits of an upward movement of the head as soon as each lift passes beyond the feed rolls, as later more fully described.

The upper feed roll 52 is journaled in a frame 60 which is pivotally connected to the head 53 by pivot members 61. The frame 60, however, is supported by a friction device to which it is connected by a link 62 and an arm 63. The friction device is shown best by Figs. 1 and 15, and includes two coöperative plates 64 and 65 and an interposed disk 66 of friction material. The arm 63 is affixed to the plate 64, and this plate is arranged to swing about a rod 67. The plate 65 is rigidly connected to the frame of the machine so that it is not capable of turning. A helical compression spring 68 is arranged upon the rod 67 and is compressed between the plate 64 and washers 69 which are held by nuts 70. The force with which the plate 64 is held against the friction disk 66 by the spring 68 clamps the plate 64 and serves to prevent the head 53 from rising under the lifting stress of the counterweight 55. When there is no lift between the feed rolls 51, 52, the upward stress of the head 53 is sustained by an abutment 71 (Fig. 10), which bears against the pivoted frame 60; but whenever a lift enters between the rolls, the rolls are forced apart by the lift, and the lift takes the place of the abutment 71 in sustaining the upward stress of the head 53. The separation of the rolls 51 and 52 by the lift is sudden and results in upward movement of roll 52 rather than downward movement of roll 51, because the inertia of the head 53, counterweight 55, and their connections, is substantially greater than that of the elements which would be moved by upward movement of roll 52. Consequently, whenever a lift enters between the feed rolls, the friction plate 64 is turned slightly with relation to the plate 65, and as soon as the lift passes from the feed rolls the head 53 rises until it is arrested by the abutment 71. The head and feed rolls are thus raised step by step as the lifts are fed, until the desired number of lifts have been deposited in the heel-form.

The head 53 is automatically returned to its lowered position preparatory to feeding the first lift of each heel. For this purpose the friction plate 64 is provided with an arm 72, and the latter is connected by a link 73 with a cam lever 74 (Fig. 2). The upper portion 75 of the link is screw-threaded and extends through a nut 76. This nut is connected with the arm 72 by a pivot stud 77. The screw portion 75 of the link is provided with a hand wheel 78 by which the link may be screwed up or down relatively to the nut to vary the normal position of the cam lever 74. The fulcrum of lever 74 is indicated at 79, and the cam which actuates the lever is indicated at 80. This cam is affixed to the shaft 178 later described and coacts with a cam roll 82 carried by the lever. When the cam is in the position shown by Fig. 2 the lever is supported by the friction device 64, 65, 66. The plane to which the head 53 is depressed by the cam is determined by the adjustment of the link 73. The shaft 178 does not rotate continuously, but is set in operation only when it is desired to transfer a heel from the heel-building mechanism to the heel-compressing mechanism. In the course of such transferring, the shaft 178 makes but one revolution and then stops, leaving the head 53 at the desired level preparatory to feeding the first lift of the next heel.

*Pasting mechanism.*

The pasting mechanism is shown best by Figs. 7 to 14. The paste is stored in a reservoir 83 which, in the present instance, is supported by stationary portions of the framework and is arranged below the feed table. The paste is carried from the reservoir to the lifts by an endless belt 84. This belt passes over two rolls 85 and 86 and is inclosed, excepting at the top and bottom, by a casing 87. The upper roll 85 is arranged on a driven shaft 88 and is keyed to said shaft. The lower roll 86 is supported by the belt and has trunnions 89 which are arranged between vertical guides 90 on the casing 87. The weight of roll 86 therefore keeps the belt sufficiently taut to insure the travel of the belt as the roll 85 is driven. The casing 87 supports a scraper 91 which is arranged to engage the upwardly moving stretch of the belt to scrape the excess paste from the belt. The scraper is mounted upon a rockshaft 92 and may be adjusted to bear with more or less pressure against the belt to vary the quantity of paste which may be carried by the roll 85.

The shaft 88 is journaled in bearing members 93, and the latter are arranged to move up and down in guides 94. Helical compression springs 95 are arranged to support the bearing members 93 so as to permit the roll 85 to be depressed by the lifts as the latter are fed from the feed table to the feed rolls. Setscrews 96 are arranged to sustain the bearing members 93 against the upward stress of the springs 95, and in practice the setscrews will be adjusted to keep the highest point of the belt approximately in or slightly above the plane of the upper surface of the feed table 50 when the latter is in the position shown by Figs. 3 and 11. The roll 85 is capable of being depressed against the stress of the springs 95 while the lift is bearing upon the belt.

The bearing structure for the shaft 88 is supported and carried by the movable head 53 so that the paste belt will rise and fall with the feed rolls 51 and 52. The belt casing 87 is also supported by the head 53, and the paste-carrying mechanism as a whole is caused to move up and down with relation to the paste reservoir. The head 53 is thus relieved of the weight of the reservoir and paste, and the paste will not be splashed in consequence of the rise and fall of the lift-feeding mechanism. The lowest part of the paste belt will be submerged in the paste even when the head 53 is raised to its highest position, so that a continuous feed of paste is assured.

Inasmuch as the paste-applying mechanism is arranged to apply the paste to the under side of the lifts, there is no necessity for applying paste to the first lift of each heel, and, furthermore, it is desirable to omit the paste from the under side of the first lift in order to avoid, as far as possible, the deposit of paste upon the elements which are afterward brought into contact with the first lift. For this reason the feed table 50 is moved automatically to the position shown by Figs. 7 and 8 preparatory to feeding the first lift of each heel. As shown by these figures, the feed table is moved toward the rear and raised with relation to the paste-applying mechanism so as to overhang the latter. The bed 53 is provided with inclined slots 97, and the feed table is supported by rods 98 which extend through the said slots. One end of a link 99 is arranged upon one of the rods 98, and the other end of said link is pivotally connected to a bell-crank lever 100. The fulcrum stud 101 is supported by a bracket 102 which in turn is supported by the head 53. The arm 103 of the bell-crank carries a weight 104 which normally keeps the feed table in its forward position relatively to the head 53, as shown by Figs. 3 and 11. When the head 53 is depressed to its initial position preparatory to feeding the first lift of the heel, the arm 103 strikes a stationary abutment 105, and the bell-crank lever is thereby rocked about its fulcrum 101 to move the feed table to the rear as shown by Fig. 7, whereby the rear end of such table overhangs the paste-applying belt and serves as shield to keep the lift out of contact therewith. The abutment 105 is mounted upon a fixed rod 106 and is provided with a set screw 107 which engages the rod to hold the abutment in any desired angular position. Said rod 106 may, however, be turned by a hand wheel on its outer end (Fig. 1) for convenient and rapid setting of the abutment. In practice the abutment 105 will be set at a position which will cause the feed table to overhang the paste-applying mechanism only when the head 53 is in its initial position. When the head is elevated in consequence of the feeding of the first lift, the bell-crank 100, 103, is enabled to rock under the influence of the weight 104 to retract the feed table to the position shown by Figs. 3 and 11, thereby adjusting the feed table to guide all the succeeding lifts of the heel into contact with the paste belt.

The mechanism for driving the paste belt and the feed rolls is shown by Figs. 1, 13, 14 and 23. The main driving pulley 108 is driven continuously by a belt 109. This pulley is affixed to a shaft 110. A toothed clutch member 111 is splined upon shaft 110 and is arranged to coact with a complemental clutch member 112. These clutch members will remain connected as long as it is desired to operate the machine. The clutch member 112 is provided with sprocket teeth 113 by which a chain 114 is driven continuously. This chain extends upwardly and passes over a double sprocket 115 which has teeth on which the chain 114 runs and teeth on which a chain 116 runs. The sprocket 115 is affixed to a shaft 117 so that said shaft will be continuously driven to operate the nail elevator of the nailing mechanism as hereinafter explained. For present purposes the rotation of the shaft 117 may be disregarded, and it will be necessary to consider merely the transmission of motion to the chain 116 by the double sprocket. A radius arm 118 is arranged upon the shaft 117 and carries a shaft 119. The latter shaft has a sprocket wheel 120 which is driven by the chain 116. Another sprocket wheel, 121, carried by the shaft 119 drives a chain 122. The upwardly moving stretch of chain 122 passes over sprocket wheels 123 and 124, and the chain makes its return bend around an idle sprocket wheel 125. The downwardly moving stretch of the chain passes over an idle sprocket wheel 126 and over a transmission sprocket wheel 127. The latter, as shown by Fig. 8, is mounted upon a stub shaft 128 which is rotatably mounted in one of the bearing members 93. One end of the shaft 88 extends into the stub shaft 128 and is keyed to the latter so that rotation will be transmitted from the sprocket wheel 127 by the stub shaft 128 to the shaft 88. The weight of the radius arm 118 is sufficient to keep the chain 122 taut, and the said arm will rise and fall with the head 53 because the sprocket wheels 123, 125, 126 and 127 are mounted upon the head.

The sprocket wheels 123 and 124 are connected respectively with the feed rolls 51 and 52, as shown by Fig. 10.

*Heel-form.*

The form in which the lifts are assembled to build the heel comprises a supporting member 129 (Figs. 3, 7 and 11), an abutment or breast-gage 130, and two movable members or side gages 131, 131. As shown by Fig. 3, the support 129 is in the form of a post and is arranged in a vertical guide 132. In practice the member 129 will be adjusted up or down according to the height of the heel which is to be built. As shown by Fig. 3 the lower portion 133 of the post is provided with a screw-thread and is arranged in a nut 134. This nut is supported by a fixture 135 and is capable of rotation. The nut is provided with gear teeth 136 in the form of a bevel gear. A bevel gear 137 (Figs. 3 and 22) meshes with the teeth 136. Gear 137 is affixed to a shaft 138, and this shaft is provided with a hand wheel 139 by which the gear may be rotated to turn the nut 134 and thus adjust the heel-support 129.

The abutment 130 is carried by the head 53, and, consequently, it rises with the head as the successive lifts are deposited one upon another upon the support. The movable members or side gages 131 of the heel-form are arranged to engage the curved edges of the lifts at the sides and back of the heel. The two members 131 are similar, excepting that they are respectively right and left in form and arrangement, and a description of one will suffice for both.

As shown by Fig. 16, the member 131 is supported by a bar 140 and is connected to said bar by a pivot pin 141. The bar is arranged in a socket 142 formed in a holder 143. The bar is adjustable in and out of the holder and is backed by an adjusting screw 144 which has screw-threaded engagement with the holder. A screw 145 carried by the holder extends into a groove 146 formed in the bar 140 to prevent the bar from turning in its socket. A binding screw 147 is carried by the holder and arranged to bear upon the bar to hold the latter rigidly with relation to the holder. The two holders 143, 143 are mounted respectively upon vertical posts 148, 148, said posts being set in the frame structure of the machine. The holders are capable of oscillating about the posts for the purpose of positioning the lifts upon the support 129, and the machine is provided with operating mechanism for causing a series of lift-positioning movements while the heel-building operation is in progress. The mechanism for this purpose is shown best by Figs. 19 and 20. Each holder 143 has a socket 149. Two bell-crank levers 150 are arranged to extend into the said sockets respectively. The fulcrum studs of the bell-cranks are indicated at 151. The lower arms of the bell-cranks are lapped and are arranged in a head 152. A pivot pin 153 carried by the head extends through the two bell-cranks and causes the latter to oscillate in unison but in relatively opposite directions as the head is moved up and down. The head is mounted upon a vertically movable post 154. This post is guided by a slide 155. A bracket 156 is pivoted on the post and carries a roll 157 which is moved by the swinging of said bracket about the post into and out of register with a cam 158. When the roll is in register with the cam, the post 154 is alternately lifted and permitted to drop by the cam. The cam is carried by a continuously driven shaft 159, said shaft receiving rotation through the clutch 111, 112 shown by Fig. 23.

In practice, the lifts will be fed with their rear edges foremost; but inasmuch as the initial feeding is performed manually, the lifts will take various angular positions in the form upon being deposited therein. They will, however, be straightened by the movable members 131 and will be moved forward against the abutment 130. The straight edges of the lifts which ultimately constitute the breast of the heel, are repeatedly pressed against the abutment 130 by the members 131, and the lifts are thus not only registered in the desired relation to each other, but the stack of lifts as a whole is registered with relation to the support 129, so that the nail which is driven through the lifts as hereinafter explained will be driven approximately at the center of the heel.

Figs. 7, 10 and 11 include a device arranged to act upon the lifts as the latter are fed into the heel-form to deflect the lifts downwardly from the feed rolls so that the lifts will not be permitted to ride over the members 131 of the heel-form. This device comprises a finger 160 and a guiding sleeve 161 therefor. The sleeve is provided with trunnions 162 which are pivotally arranged in a holder 163. The holder is affixed to the frame 60 which supports the feed roll 52. A tension spring 164 is connected to the upper end of the finger 160 and normally draws the latter downwardly into the path of the lifts. A pin 165 carried by the finger 160 bears upon the roll 52, and the latter is cut away as indicated at 166 to provide a recess into which the pin may drop as the roll rotates. The recessed part of the roll thus has a cam action by which the finger 160 is moved upwardly through the sleeve, the spring 164 causing the pin 165 to follow the contour of the roll so that the finger 160 is reciprocated longitudinally. The trunnions 162 enable the sleeve to oscillate so that the finger 160 may have oscillatory movement as well as longitudinal movement. The lower end of the finger 160 is therefore caused to bear upon the lift or lifts which have been fed past the feed rolls, and to push the lifts successively against the curved gage members 131 of the heel-form to assist in positioning the lifts according to a uniform arrangement.

When the required number of lifts have been deposited in the heel-form to form a heel, the operative moves a lever 167 (Figs. 1 and 2) pivoted at 168, by which mechanism is set in operation to drive a nail through the lifts and to transfer the nailed heel to the pressing mechanism. A link 169 connects the lever 167 with a clutch lever 170, pivoted at 171, the lower end of which has pin-and-groove connection with a clutch member 172. As shown by Figs. 23 and 24 the clutch member 172 is arranged upon a sleeve 173 and is connected to said sleeve by a spline 174. The sleeve is the bearing for the continuously driven shaft 110. During the heel-building operation this shaft rotates without imparting rotation to the sleeve, but upon moving the lever 167 to slide the clutch member 172 toward the left from the position shown by Fig. 23, the clutch member is moved into coöperative engagement with a clutch member 175 secured to the driving pulley 108. The sleeve 173 is thus set in motion, and it drives mechanism now about to be described.

A pinion 176 carried by the sleeve 173 drives a gear 177. (See Figs. 1 and 13). This gear is affixed to a shaft 178. Referring now to Figs. 19, 20 and 21,—a cam 179 carried by shaft 178 engages a roll 180 which is carried by the swinging bracket 156. This cam acts to swing the cam roll 157 out of register with the cam 158, as indicated by dotted lines in Fig. 21. The movable members 131 of the heel-form are thus disconnected from the cam which retracts them from the stack of lifts, and they have a prolonged clamping action upon the lifts due to the weight of the post 154 and the parts which are supported thereby, namely, the parts which transmit the lifting action from the cam 158 to the bell-cranks 150. The cam 179 holds the swinging bracket 156 out of operative position until a nail has been driven through the lifts, and the bracket is returned to its initial position by a spring 182.

Before describing the nailing mechanism I will describe other mechanism included in Figs. 19, 20 and 21 by which the movable members 131 of the heel-form are retracted to permit the removal of the heel.

The slide 155 carries a roll 183 which rests upon a cam 184 on the shaft 178. The cam lifts the roll immediately after the nail has been driven, and the slide 155 is thus raised. The upward movement of the slide is transmitted to the bracket 156 and by the latter to a collar 185 pinned or otherwise affixed to the post 154. As the post rises, the bell-crank levers 150 are actuated to retract the members 131 of the heel-form. The slide 155 descends of its own weight as soon as the high point of the cam 184 passes the roll 185; but its descent is assisted by a tension spring 181.

Nailing mechanism.

While the heel-building operation is in progress, a nail $x$ (Fig. 41) is held in a tubular nail-holder 186 above and in register with the heel support 129. The nail holder is carried by a swinging arm 187. A spring 188 fastened to the arm occupies a slot 189 and normally intersects the throat 190 of the nail holder so as to underlie the head of the nail to support the latter. Until the nailing mechanism is set in operation the nail holder is supported a substantial distance above the top of the stack of lifts; but when the nailing mechanism is set in operation in consequence of connecting the clutch members 172 and 175, the arm 187 is depressed to cause the nail holder to bear upon the stack of lifts with pressure. The stack of lifts is thus clamped from top to bottom by the support 129 and the nail holder prior to and during the nail-driving operation.

As shown by Figs. 15 and 38, the arm 187 is affixed to a vertical sleeve 191. This sleeve is arranged to slide vertically in guides or bearings 192. The sleeve has swivel connection with a bar 193, the latter having a hub surrounding the sleeve between collars 194 and 195. The lower end of the bar 193 is formed with a slot 196 through which the shaft 178 extends. A helical compression spring 197 is arranged to bear against the lower end of the bar 193, and normally exerts its force to raise the bar and also the sleeve 191 and the nail holder. A roll 198 carried by the bar 193 coacts with a cam 199 on the shaft 178. This cam depresses the bar, the sleeve 191, and the nail holder, to cause the vertical clamping of the stack of lifts as hereinbefore explained.

It has been hereinbefore stated that the sleeve 191 has swivel connection with the bar 193. This form of connection enables the sleeve to turn to carry the nail holder from the angular position shown by Fig. 15 to another angular position in register with nail-feeding mechanism, where it receives a nail, so that the nail holder may carry the nail from the nail-feeding mechanism into register with the lifts which are to be nailed, that is, to the nail-driving position. For the purpose of turning the sleeve 191 the collar 194 is provided with gear teeth 200. (See Figs. 37 and 39). The teeth 200 are enmeshed with a gear segment 201, and the latter is carried by one arm of a two-armed lever 202 whose fulcrum stud is indicated at 203. A roll 204 on the other arm of said lever 202 is arranged to coact with a cam 205 on the shaft 178. The roll is caused to follow the cam by a tension spring 206, one end of which is connected to the gear segment as shown by Figs. 37 and 39. The teeth 200 are elongated vertically so as to remain enmeshed with the segment 201, notwithstanding the vertical motion which said teeth have incidentally to the heel-clamping action of the nail holder.

The nail driver is indicated at 207. It is affixed to a driver bar 208, and the latter is carried by an arm 209. This arm is affixed to a guide bar 210 which extends through the sleeve 191 and is capable of vertical movement relatively to the sleeve. A roll 211 at the lower end of the bar 210 is arranged to rest upon a lifting cam 212. When the roll is released by the cam the driver descends under the stress of a pair of driver springs 213, said springs being arranged to bear upon the arm 209.

The nail reservoir 214 is shown in Figs. 2 and 40. It is of the rotary type and has trunnion portions 215 arranged in bearings 216. A belt 217 passes over the reservoir and likewise under a continuously driven pulley 218, (see Figs. 1 and 2) on the previously described shaft 117. Scoops or blades 219 formed upon the interior of the reservoir lift the nails and discharge them upon an inclined raceway 220 which extends through a central opening in one of the trunnions 215. As shown by Figs. 40, 46 and 48, the lower portion of the raceway is slotted so that the shanks of the nails will hang suspended while the heads of the nails rest upon the raceway. The lower end of the raceway is normally obstructed by a picking or feeding device 221. This pick has a point 222 and a throat 223. A spring 224 connected to the picking device normally holds the latter in the position shown by Fig. 46, thereby preventing the escape of nails from the raceway. The picking device has pin-and-slot connection at 225 with an arm 226, affixed to a rockshaft 227. Another arm 228 is affixed to the rockshaft and carries a stud 229 which is arranged to be engaged and displaced by the nail-holder arm 187 when the latter is moved to carry the nail holder to nail-receiving position as shown by Figs. 45 and 47. As the stud 229 is displaced it rocks the shaft 227 and thus moves the nail pick to the position shown by Fig. 47, the point 222 of the nail pick being thus caused to separate the foremost nail from the remaining nails in the raceway and to advance the foremost nail beyond the end of the raceway so that the nail may drop into the nail holder which reaches a position in register with the nail by the time the nail is discharged. The throat of the nail holder is flared at its upper end to facilitate the entrance of the nail, and the nail drops until its head reaches the retaining spring 188. The nail holder, upon receiving a nail, is returned to the angular position shown by Fig. 15, thus releasing the nail pick so that the latter may be returned by its spring 224 to the position shown by Fig. 46.

The return angular movement of the nail holder as caused by the spring 206 (Fig. 37) is limited by an adjustable stop 230. This stop is in the form of a rod and is arranged to be engaged by an ear 231 formed upon the hub of the arm 187. The stop is screw-threaded in a portion 232 of the frame of the machine. In practice the stop would be screwed in farther for a large heel than for a small heel, with the idea of locating the nail approximately in the center of the heel. When the stop 230 is adjusted to vary the location of the nail, a corresponding adjustment would be made with regard to the position of the nail driver so that the latter would be in register with the nail. For this purpose the guide 192 is provided with an arm 233 which guides the driver bar 208. The member 192 is capable of angular adjustment about the sleeve 191 and is formed with a slot 234 (Fig. 15) through which a clamping bolt 235 extends. Clamping nuts 236 are threaded upon the bolt to clamp the member 192 in the desired angular position upon the portion 232 of the frame.

Transferring mechanism.

As soon as the nail has been driven, as shown by Fig. 42 the nail holder rises and the movable gages or forms 131 are retracted to release the heel so that the latter may be transferred to that part of the machine in which the heels are held under compression for a time before being delivered as completed heels. Figs. 2, 22 and 32 to 36 illustrate the transferring mechanism. The heel is taken from the support 129 by a pair of gripping jaws 237 and 238. These jaws are mounted upon a sliding carriage 239 which is arranged to slide horizontally on guide bars 240. The jaws are arranged to swing about a vertical axis, the carriage having for this purpose a vertical post 241 and a swivel head 242 arranged to turn on said post. The jaw 237 is affixed to the head, but the jaw 238 is movably mounted on the head as shown by Fig. 36. A shank 243 formed upon the jaw 238 is arranged in a socket 244 and is capable of moving vertically therein. The shank as shown is formed with a spring-receiving socket in which a helical compression spring 245 is arranged, the function of the spring being to move the jaw 238 toward the jaw 237, to clamp the heel as shown by Fig. 32.

When the carriage is in the position shown by Fig. 3 the lower jaw is held depressed against the force of the spring 245 by a latch 246. The upper end of this latch is connected to the jaw by a pivot member 247. A latching shoulder 248 is formed upon the latch and is caught under a catch 249 on the swivel head. As the jaws advance from the position shown by Fig. 3 to take the heel, the latch 246 strikes an abutment 250 (Fig. 32) and is thereby disengaged from the catch 249. At the moment of release the jaws are in register with the heel, and the spring 245 raises the jaw 238, thus lifting the heel sufficiently to carry the latter into contact with the jaw 237. The heel support 129 is cut away as indicated at 251 to provide a recess into which the jaw 238 may enter to take hold of the heel. Spurs 252 are set into the jaw 238 in position to indent the bottom lift of the heel as shown by Fig. 32, and the angular position of the heel with relation to the jaws is thus maintained.

When the heel has been grasped by the jaws the sliding carriage 239 is moved to the rear, or to the left with reference to Figs. 3 and 22. During the first part of the heel-carrying movement an anti-friction roll 253 and an ear 254 on the swivel head 242 (Fig. 22) travel along a surface 255 of a bar 256. This bar has a tooth or projection 257 which lies in the path of the roll 253, and the latter upon striking said tooth or projection is arrested, thus causing the head 242 to turn about the post 241. Another anti-friction roll 258, carried by the head, is thus brought into position to engage a shoulder 259 on the bar 256, and the angular movement of the head is prolonged by the coaction of said roll and shoulder until an ear 260 on the head is brought into engagement with surface 261 of the bar 256. The swivel head is thus turned 180 degrees about its axis; and during the remainder of the travel of the carriage toward the heel-compressing mechanism, the roll 258 and ear 260 traverse the surface 261 and thus hold the swivel head in the desired angular position for depositing the heel in the heel-compressing mechanism.

Fig. 33 shows the transferring jaws about to deposit the heel in the heel-compressing mechanism, the direction of heel-carrying movement being indicated by an arrow. The carrying jaws, as shown by Fig. 32, appear to occupy the same angular position as they do in Fig. 32, although they have an angular movement of 180 degrees while carrying the heel. This similarity between Figs. 32 and 33 is due to the fact that in Fig. 33 the jaws are viewed from the right-hand side of the machine, whereas in Fig. 32 they are viewed from the left-hand side of the machine.

Before describing the structure of the heel-compressing mechanism I will complete the description of the heel-transferring mechanism with reference to the return movement of the heel-carrying jaws to their initial position. As the jaws are about to reach the end of their heel-carrying travel, an adjustable abutment 262 on the head 242 (Fig. 33) strikes the lower arm of a bell-crank lever 263. This lever is mounted upon a stationary fulcrum stud 264, and is normally held in the position shown by Fig. 33 by a tension spring 265. A roll 266 underlies the upper arm of the bell-crank 263; and as the bell-crank is swung by the abutment 262, its upper arm is depressed as shown by Fig. 34, thus depressing the latch 246 and with it the lower jaw 238. The heel is thus released and deposited in the heel-compressing mechanism. A shoulder 267 on the bell-crank lever engages the roll 266 and causes an angular movement of the latch 246 whereby the latching shoulder 248 is set under the catch 249. When the sliding carriage 239 is retracted, the shoulder 267 holds the latch against the catch 249, and the shoulder 248 settles against the catch as soon as the roll 266 moves out of engagement with the bell-crank lever.

Referring to Fig. 22, as the sliding carriage returns to its initial position the roll 258 strikes the tooth 257 and the swivel head 242 is thus turned in the reverse direction, the roll 253 being thereby moved into position to strike a shoulder 268 on the bar 256. The angular movement of the head is prolonged by the roll 253 and shoulder 268 until the ear 254 strikes the surface 255 of the bar. The swivel head is thus returned to its initial angular position, and the carriage stops in the position shown by full lines in Fig. 22. The carriage is also shown in its initial position by Fig. 3. Fig. 22 includes dotted lines representing the base of the swivel head in three positions. The right-hand dotted position is the heel-receiving position and corresponds to the position shown by Fig. 32. The left-hand dotted position represents the heel-delivering position and corresponds to Fig. 34. The intermediate dotted position represents the intermediate angular position of the head.

The mechanism for reciprocating the carriage 239 is shown by Fig. 2. A path cam 269 is affixed to shaft 178 and coacts with a roll 270 carried by a lever 271. The fulcrum member of this lever is indicated at 272. Said lever has a slot concentric with said fulcrum (shown dotted) through which the shaft passes, and long enough to permit the full swing of the lever. A link 273 connects the lever with the carriage 239.

Inasmuch as the transferring mechanism and nailing mechanism have no duty to perform between the time of their restoration to their respective initial positions and the completion of the next stack of lifts, I have provided mechanism which automatically disconnects the clutch which drives the shaft 178. The clutch mechanism now under consideration is that indicated at 172, 175 in Figs. 23 and 24. It has been stated that the operative moves the clutch member 172 to driving position upon the completion of the lift-feeding operation. The clutch lever 170 is provided with a retaining device by which it is held in either of its two positions. This device comprises two coöperative pins 274 and 275, and a helical compression spring 276. The pin 274 is set in a socket 277 in the lever 170 and is adapted to slide in and out of said socket. The spring 276 is likewise arranged in the socket and is behind the pin 274 and normally forces the pin outwardly. The pin 275 is fixed in a portion of the frame of the machine. The confronting ends of the two pins are beveled so that the pin 274 will be forced back as it moves past the pin 275.

The lever 170 is moved manually from the position shown by Fig. 23 to that shown by Fig. 24, and the stress of the spring 276 keeps the clutch connected during the nailing operation and the heel-transferring operation. One end of a bar 279 is connected to the lever 170 by a pivot pin 280. This bar extends through a guide 281, and its inner end is arranged to be engaged by a tumbler 282 mounted upon the sliding carriage 239. The tumbler is mounted upon a pivot pin 283 and normally rests in the position shown by Fig. 23 and by full lines in Fig. 24. The tumbler is cut away at its under side to enable the bar 279 to move to the position shown by Fig. 24; and as the sliding carriage moves to the rear after having advanced to take the heel, an inclined under surface 284 (Fig. 25) rides upon the inner end of the bar 279 and the tumbler is thereby tilted to the position indicated by dotted lines in Fig. 24. The tumbler therefore rides over the bar 279, and upon passing beyond the bar it drops to its former angular position. As the sliding carriage is about to reach its initial position after having transferred a heel, an inclined surface 285 on the side of the tumbler (Figs. 22 and 25) strikes the inner end of the bar 279 and deflects the bar to the left, thereby retracting the clutch member 172 from the clutch member 175.

Heel pressing mechanism.

The means for retaining heels under pressure after they have been built and nailed, as hereinbefore described, and to which the heels are transferred by the mechanism last described, is located at the rear of the machine and is supported by a stand 286. (See Figs. 3, 4 and 5). It comprises a series of heel-clamping units each of which is adapted to receive a heel. The heel-clamping units are, in the present instance, arranged in a circular series upon a rotary carrier 287. This carrier is provided with a crown ratchet 288, the number of teeth of which is equal to the number of heel-clamping units. A driving pawl 289 (see Fig. 30) coacts with the ratchet to move the heel-clamping units successively into register with the heel-transferring jaws. The driving pawl is pivotally mounted at the upper end of a bar 290. The lower end of this bar (Figs. 3 and 4) is attached to a bell-crank 291 whose fulcrum pin is indicated at 292. Referring to Fig. 3,—an operating bar 293 is pivotally connected at its rear end to the bell-crank, and its forward end is formed with a slot 294 through which the shaft 178 extends, the slotted end of the bar being arranged to ride upon the shaft. A collar 295 affixed to the shaft 178 is provided with a lug 296, and the bar 293 is provided with fingers 297 and 298 which are arranged to be engaged alternately by the lug 296 as the latter is carried around by the shaft. The direction of rotation of the shaft is indicated by an arrow at the lower right-hand portion of the cam 269. As the lug moves around the axis of the shaft, it engages the finger 297 and moves the bar 293 to the left, thereby drawing the driving pawl 289 downwardly to advance the carrier. The lug passes out of contact with the finger 297 and engages the rear side of the finger 298, thereby moving the bar 293 to the right.

A friction brake is provided for arresting the rotation of the carrier 287 to prevent overtravel of the carrier when the driving pawl 289 has completed its driving stroke. This brake is shown by Figs. 5 and 31. A substantially semi-circular brake shoe 299 is arranged to bear upon the hub 300 of the carrier and is held under pressure against the hub by two helical compression springs 301. The hub is provided with a ring 302 of friction material.

The structure of the heel-clamping units is shown best by Figs. 4, 26 and 27. The several units are alike in the matter of structure, and a description of one will serve for all. Referring to Fig. 26,—the clamping members are indicated at 303 and 304. The member 303 is affixed to the carrier 287, but the member 304 is mounted upon a slide 305 by means of a pivot pin 306. The ends of the pin are arranged in a pair of hook portions 307 formed upon the slide, and the pin is capable of moving in the hook portions to permit relative bodily movement of the member 304 and slide 305. The member 304 is also capable of angular movement about the axis of the pin in order to be adjusted according to the inclination or pitch of the heel.

The slide 305 has a neck 308 which extends through a slot 309 in the member 303. Flanges 310 extend in opposite directions from the neck 308, and are lapped with relation to ribs 311 formed upon the member 303. The function of the flanges 310 and ribs 311 is to keep the slide connected with the member 303. The slide is otherwise connected with the member 303 by a link 312, one end of the link being connected to the slide by a pivot pin 313. A pin 314 affixed to the link and projecting from the opposite sides of the latter is arranged to coact with the ribs 311. (See Fig. 5). The link serves as a clutch to lock the slide 305 to the member 303 at any position for the purpose of holding the heel under pressure as shown by Fig. 27. For this purpose the link is provided with lugs 315 which engage the front sides of the ribs 311. When the link is in the angular position shown by Fig. 26, the slide is free to slide on the ribs 311; but when the link is in the angular position shown by Fig. 27, the pin 314 and lugs 315 have a conjoint binding or pinching action on the ribs, and the tendency of the slide to move away from the heel maintains the link in the angular position shown by Fig. 27.

The pin 306 is normally held seated in the crotch of the hook portions 307 by a pair of helical compression springs 316 (see Fig. 4) and when the slide 305 is moved toward the heel to press upon the latter, the heel-engaging member 304 becomes seated upon the top of the heel before the downward movement of the slide 305 is completed. The remainder of the downward movement of the slide compresses the springs 316 and thus puts the heel under pressure. While the slide 305 is held depressed, the free end of the link 312 is depressed to cause the pin 314 and lugs 315 to pinch or bind the ribs 311, and the slide is thus locked in heel-clamping position. The heel pressing movement of the slide 305 is effected by a stationary cam 317 (see Fig. 4) the slide having an anti-friction roll 318 arranged to ride upon the cam. This cam is in the form of a bar and is adjustable to vary the movement of the slide according to the height or depth of the heel. One end of the cam bar is mounted upon a pivot pin 319. The other end of the cam bar is formed with a slot 320. A binding screw 321 extends through the slot 320 and through a fixture 322. A binding nut 323 is screwed upon the screw 321 and serves to draw the head of the screw against the bar 317 to bind the latter to the fixture 322. The heel-clamping unit indicated at 324 in Fig. 4 is in register with the heel-transferring mechanism, the slide 305 being raised to permit the deposit of a heel in said unit by the transferring mechanism. Still referring to Fig. 4,—the carrier which carries the heel-clamping units moves in the direction of the hands of a clock, and each unit upon being moved one step from heel-receiving position is put under pressure by the cam 217.

Referring now to Fig. 5, which is a rear elevation of the heel-retaining mechanism, the cam which locks the slide in heel-clamping position is indicated at 325. This cam is shown also in Figs. 27 and 29. In one sense the cam 325 is stationary, although it is capable of yielding. It is connected by a pivot member 326 with a fixed bar 327. The free end of the cam is connected to one end of a tension spring 328 by which it is normally drawn downwardly. This cam is arranged to be out of contact with the link 312 when the heel-grasping unit is in heel-receiving position, but is arranged to depress the link during the first step in the travel of the unit from heel-receiving position.

Each heel remains under pressure throughout nearly one complete cycle of the carrier 287, but shortly before the unit again reaches heel-receiving position the slide 305 is released and the heel is ejected. The release of the slide is caused by the stationary bar 327 hereinbefore mentioned. This bar is arranged to engage the under side of the link 312 as shown by Figs. 5 and 26. The upper surface of the bar 327 is formed to move the links 312 toward the axis of the carrier, and the links are thus moved from the angular position shown by Fig. 27 to that shown by Fig. 26. The cam 327 not only moves the links to release the slides, but it moves the slides toward the axis of rotation, the latter movement being due to contact which the upper surface of the link has with the slide 305 as indicated at 329 in Fig. 26. Each unit has an interval of dwell between the time when its slide 305 is released and retracted and the time of its arrival at heel-receiving position; and during such interval it remains in register with a heel-ejector 330. (See Figs. 3 and 6.) The ejector is in the form of a two-armed lever and is mounted upon a fulcrum stud 331. The ejector is formed and arranged to enter the slot 309 (Fig. 5) of the member 303. Fig. 3 shows the ejector in its retracted position. In Fig. 6 the ejector is shown in its retracted position by full lines and in its advanced position by dotted lines. The arm 332 of the ejector carries an anti-friction roll 333 which is arranged to be engaged by an abutment 334 on the heel-transferring carriage 239. (See also Figs. 3, 33 and 34.) The ejecting movement occurs during the latter part of the heel-transferring movement of the carriage, so that each completed heel is discharged simultaneously with the deposit of a new heel in the heel-clamping unit which is in heel-receiving position. The center of gravity of the ejector is so placed that the latter will normally fall back to its retracted position; but in order to guard against failure the sliding carriage 239 is provided with a finger 335 which engages the rear side of the roll and positively retracts the ejector as the carriage returns to its initial position. A chute 336 is arranged to conduct the ejected heels to one side of the machine where a receptacle (not shown) may be provided for receiving them.

I claim:

1. In a heel-building machine, a support for the heel, coöperative feed rolls arranged to feed lifts one by one to said support, a feed table arranged to guide the lifts to said rolls, and means arranged to raise said rolls and table as the heel is built, to deliver the lifts one upon another on said support.

2. In a heel-building machine, a support for the heel, coöperative feed rolls arranged to feed lifts one by one to said support, one of said rolls being movable from the other by the lifts, and means operative through such relative movement of said rolls to raise said rolls, to deliver the lifts one upon another on said support.

3. In a heel-building machine, a support for the heel, an upper feed roll and a lower feed roll arranged to coact to feed lifts one by one to said support, a carrier for said upper feed roll, a carrier for said lower feed roll, said carriers being movable up and down, friction means arranged to sustain said upper carrier, and means constantly applying force to said lower carrier to cause said lower roll to follow said upper roll.

4. In a heel-building machine, a support for a heel, means arranged to feed lifts one by one to said support, and means operative through the lifts for raising said feeding means intermittently, whereby the lifts are fed in successively higher planes.

5. In a heel-building machine, a support for the heel, means arranged to feed lifts one by one to said support, means arranged to guide the lifts to said feeding means, paste-applying means arranged to paste the lifts as the latter move toward said feeding means, and means arranged to cause relative movement of said guiding means and said paste-applying means to prevent the application of paste to a lift by said paste-applying means as such lift traverses said guiding means.

6. In a heel-building machine, a support for a heel, means arranged to feed lifts one by one to said support, a feed table arranged to guide the lifts to said feeding means, means arranged to apply paste to the under sides of the lifts as the latter move toward said feeding means, and means arranged to move said feed table to cover said paste-applying means, whereby a lift traversing said feed table is prevented from receiving paste from said paste-applying means.

7. In a heel-building machine, a support for a heel, means arranged to feed lifts one by one to said support, means arranged to guide the lifts to said feeding means, means arranged to apply paste to the lifts as the latter move toward said feeding means, means arranged to raise and lower said feeding means and said guiding means and said paste-applying means to deliver successive lifts of one heel in successively higher planes and to deliver the first lift of each heel in a relatively low plane, and means arranged to cause relative movement of said guiding means and said paste-applying means to prevent the application of paste to one lift of each heel.

8. In a heel-building machine, a support for the heel, means arranged to feed lifts one by one to said support, a reservoir for paste, means arranged to feed paste from said reservoir to the lifts as the latter are being fed, said paste-feeding means being movable up and down with relation to said reservoir, and means arranged to move said lift-feeding means and said paste-feeding means up and down in coöperative relation to deliver successive lifts of one heel in successively higher planes and to deliver the first lift of each heel in a relatively low plane.

9. In a heel-building machine, a support for a heel, means arranged to feed lifts one by one to said support, means arranged to apply paste to the lifts as the latter are fed, and means arranged to move said lift-feeding means and said paste-applying means up and down in coöperative relation to deliver successive lifts of one heel in successively higher planes and to deliver the first lift of each heel in a relatively low plane.

10. In a heel-building machine, a heel-form including a heel support and means arranged to engage the edges of the lifts on said support, means arranged to feed lifts one by one and stack them on said support, means arranged to act upon the lifts successively as they are deposited in said form, to move them edgewise against said edge-engaging means, means arranged to coact with said support to clamp the lifts from top to bottom of the stack, and means arranged to drive a nail through the lifts.

11. The combination with heel-building mechanism, of a series of heel-clamping units each adapted to clamp a heel, means arranged to transfer the heels one by one from said heel-building mechanism to said heel-clamping units respectively, means arranged to move said heel-clamping units successively into register with said transferring means, and means arranged to act successively upon said heel-clamping units to cause heel-clamping action of the latter.

In testimony whereof I have affixed my signature, in presence of two witnesses.

GEORGE E. GROVER.

Witnesses:
ELINOR I. MACLSON,
H. ASHLEY BOWEN.